United States Patent
Hirano et al.

(10) Patent No.: US 8,279,807 B2
(45) Date of Patent: Oct. 2, 2012

(54) COMMUNICATION CONTROL METHOD, NETWORK NODE, AND MOBILE TERMINAL

(75) Inventors: Jun Hirano, Kanagawa (JP); Mohana Dhamayanthi Jeyatharan, Singapore (SG); Chan Wah Ng, Singapore (SG); Pek Yew Tan, Singapore (SG)

(73) Assignee: Panasonic Corporation, Osaka (JP)

( * ) Notice: Subject to any disclaimer, the term of this patent is extended or adjusted under 35 U.S.C. 154(b) by 293 days.

(21) Appl. No.: 12/680,175

(22) PCT Filed: Sep. 30, 2008

(86) PCT No.: PCT/JP2008/002750
§ 371 (c)(1),
(2), (4) Date: Mar. 25, 2010

(87) PCT Pub. No.: WO2009/044539
PCT Pub. Date: Apr. 9, 2009

(65) Prior Publication Data
US 2010/0214982 A1  Aug. 26, 2010

(30) Foreign Application Priority Data

Oct. 5, 2007  (JP) .................................. 2007-261597
Apr. 24, 2008  (JP) .................................. 2008-114287

(51) Int. Cl.
*H04W 8/02* (2009.01)
*H04W 60/00* (2009.01)
(52) U.S. Cl. ..................................... 370/328; 455/435.1
(58) Field of Classification Search .................. 370/328, 370/329, 331, 338, 349; 455/435.1, 436
See application file for complete search history.

(56) References Cited

U.S. PATENT DOCUMENTS

| | | | | |
|---|---|---|---|---|
| 7,447,188 | B1 * | 11/2008 | Dommety et al. | 370/342 |
| 7,756,061 | B2 * | 7/2010 | Matsumoto | 370/254 |
| 2004/0013099 | A1 | 1/2004 | O'Neill | |
| 2004/0024901 | A1 | 2/2004 | Agrawal | |

(Continued)

FOREIGN PATENT DOCUMENTS

JP  2005-143086  6/2005

(Continued)

OTHER PUBLICATIONS

International Search Report dated Oct. 28, 2008.

(Continued)

*Primary Examiner* — Brian D Nguyen
(74) *Attorney, Agent, or Firm* — Dickinson Wright PLLC

(57) ABSTRACT

A technology is disclosed with which a mobile terminal moving in a PMIP domain receives various types of prefixes and selects a type of an address to be configured, and route optimization is performed without adding a signaling load on the PMIP domain. According to the technique, when connecting with a home domain, a MN (310) requests a plurality of prefixes. When a MAG (320) makes an AAA server (340) authorize the MN and receives a notification instruction of the plurality of prefixes from the AAA server, the MAG 320 makes a notification of the plurality of prefixes with a RA message (364), for example. The MN configures a plurality of addresses (for example, a PMIP address including a PMIP domain prefix or a global address including an on-link prefix) from the plurality of prefixes received and notifies the MAG of the same. The MAG registers a plurality of bindings relating to the plurality of addresses with a LMA (330).

17 Claims, 15 Drawing Sheets

U.S. PATENT DOCUMENTS

| | | | |
|---|---|---|---|
| 2004/0047322 A1* | 3/2004 | O'Neill | 370/338 |
| 2004/0156346 A1* | 8/2004 | O'Neill | 370/338 |
| 2005/0083885 A1 | 4/2005 | Ikeda | |
| 2006/0146742 A1* | 7/2006 | Kawahara et al. | 370/328 |
| 2007/0088708 A1* | 4/2007 | Vijayarajan | 707/10 |
| 2007/0230410 A1* | 10/2007 | Thubert et al. | 370/338 |
| 2007/0297377 A1* | 12/2007 | McCann et al. | 370/338 |
| 2008/0043614 A1* | 2/2008 | Soliman | 370/208 |
| 2009/0019180 A1* | 1/2009 | Aso et al. | 709/238 |

FOREIGN PATENT DOCUMENTS

| | | |
|---|---|---|
| WO | 02/065731 A3 | 8/2002 |
| WO | 03/090408 A1 | 10/2003 |
| WO | 2006/012511 A1 | 2/2006 |
| WO | 2007/050624 A3 | 5/2007 |

OTHER PUBLICATIONS

D. Johnson, et al., "Mobility Support in IPv6," Network Working Group, Jun. 2004, p. 1-166.

S. Gundavelli, et al., "Proxy Mobile IPv6," NETLMM WG Internet Draft, Mar. 2007, p. 1-52.

H. Soliman, et al., "Interactions between PMIPv6 and MIPv6: scenarios and related issues," NETLMM Working Group Internet-Draft, Apr. 2007, p. 1-23.

A. Qin, et al. "PMIPv6 Route Optimization Protocol," Network Working Group Internet-Draft, Feb. 2007, p. 1-24.

3GPP TR 23.882, V1.9.0, "3GPP System Architecture Evolution: Report on Technical Options and Conclusions," V1.9.0, Mar. 2007, p. 1-182.

R. Wakikawa, et al., "Multiple Care-of Addresses Registration," Monami6 Working Group Internet-Draft, Mar. 2007, p. 1-41.

M. Jeyatharan, "Multiple Interfaced Mobile Nodes in NetLMM," NetLMM Working Group Internet-Draft, Sep. 2007, p. 1-12.

S. Gundavelli, "Proxy Mobile IPv6," NETLMM WG Internet-Draft, Sep. 2007, p. 1-62.

I. Akiyoshi, et al., "Proposal of Local Mobility Network with Edge-Intelligence," IEICE Technical Report, Mar. 2006, p. 189-192.

* cited by examiner

830 BINDING CACHE

| HoA/PREFIX | CoA | IF-ID/BID | SEQUENCE NUMBER | TIME STAMP |
|---|---|---|---|---|
| HOME PREFIX | ADDRESS OF MAG 811 | IF2 | N.A. | T1 |
| HoA | CoA | IF1 | 3127 | T3 |
|  |  |  |  |  |

FIG. 11D
PRIOR ART

271D BINDING CACHE

| HoA/PREFIX | CoA | IF-ID/BID | SEQUENCE NUMBER | TIME STAMP |
|---|---|---|---|---|
| HOME PREFIX | ADDRESS OF MAG 266 | IF2 | N.A. | T1 |
| HoA | CoA (AR) | IF1 | 3127 | N.A. |
| HOME PREFIX | ADDRESS OF MAG 265 | IF1 | N.A. | T2 |

COMMUNICATION CONTROL METHOD, NETWORK NODE, AND MOBILE TERMINAL

TECHNICAL FIELD

The present invention relates to a communication control method, a network node and a mobile terminal in association with a communication technique using an Internet Protocol (IP), and particularly relates to a communication control method, a network node and a mobile terminal in a system where the mobile terminal (hereinafter this may be called a mobile node) conducts communications in a network based local mobility management domain while changing a connection point.

BACKGROUND ART

Currently, a large number of devices conduct communications mutually using an IPv6 (Internet protocol version 6). In order to provide mobile equipment with mobility support, IETF (Internet Engineering Task Force) is developing techniques based on MIPv6 (Mobility Support in IPv6) (see the following Non-Patent Document 1).

The mobility support described in Non-Patent Document 1 is put into practice by introducing an entity known as a home agent (HA) to a home network. A mobile node (MN) uses a binding update (BU) message to register a care-of address (CoA) with the home agent. This binding update allows the home agent to generate binding between the home address (HoA) (address acquired at a home link) and the care-of address of the mobile node. The home agent has a function of receiving (intercepting) a message addressed to the home address of the mobile node and using encapsulation of a packet (this means that a certain packet is made a payload of a new packet, which is known as a packet tunneling also) to transfer the packet to the care-of address of the mobile node.

MIPv6 further specifies a method of route optimization (RO) in communication with a correspondent node (CN). This RO mechanism allows a MN to register its own care-of address with a CN, whereby the MN and the CN can conduct a mutual communication using the care-of address of the MN while bypassing the home agent of the MN. Further, the CN can understand the effectiveness of the care-of address of the MN using a return routability (RR) test. The return routability is started from the MN, showing to the CN that the care-of address of the MN is in association with the home address of the MN (that is, the care-of address and the home address are used by a common MN). Note here that this RO mechanism is optional, which is effective only when the CN supports a function of the RO mechanism.

One of the problems of MIPv6 resides in that a HA and a CN (both may be plural) have to updated every time a connection point of a MN with a network is changed. Because of this problem, when a MN travels fast, for example, a lot of signaling associated with a change in location information of the MN generates in a short time, causing an increase in throughput given to the network.

Further, a RR test and the transmission of a BU message are conducted when a connection point with a network is changed, and therefore a handoff time occurs with the CN every time a connection point with a network is changed. Since it takes a considerable time to complete the handoff, jitter and packet loss are generated in a flow in a communication with a CN and a session associated therewith. Such jitter is inconvenient for VoIP (Voice over IP), multimedia streaming and video streaming, and such packet loss is inconvenient for a flow to transmit important text data information.

Herein, even when TCP (Transmission Control Protocol) is used for an application dealing with important text data information, a packet is resent due to packet loss, thus degrading throughput of the TOP.

In order to solve such problems of MIPv6, a large number of types of terminal-based local mobility management protocols have been proposed. One of the most known protocols among them is HMIPv6 (Hierarchical Mobility Management Protocol version 6). Currently, this HMIPv6 has become IETF standard.

For instance, an object of the terminal-based local mobility management protocol including HMIPv6 is to decrease signaling load (an increase in band consumption and signaling throughput due to signaling) generated by movement of a MN and to decrease handoff delay. In such terminal-based local mobility management protocol, however, a MN needs to transmit BU to a MAP (Mobility Anchor Point) even when a connection point is changed in a local mobility management domain. Thus, every time a connection point is changed, the MN needs to transmit some signaling through a wireless access network, thus leading to a problem of extra battery power of the MN consumed to transmit signaling for location information updating in such a local domain.

Meanwhile, a network-based local mobility management (NETLMM) working group in IETF is discussing about protocol achieving the same object as of the terminal-based local mobility management protocol (for example, see the following Non-Patent Document 2). The network-based local mobility management protocol uses network-based local mobility management signaling instead of terminal-based local mobility management signaling.

One type of such network-based local mobility management protocol discussed in the NETLMM working group includes proxy mobile IPv6 (PMIPv6). This protocol is the most supported in the NETLMM working group, having a possibility of being adopted as a standard protocol for network-based local mobility management services.

PMIPv6 is a technique attempted to achieve MIPv6-based mobility management in a local domain using a function of a proxy mobility agent (PMA) provided in MAG (Mobile Access Gateway). PMIPv6 is mainly configured to support mobility in a local place of a network for an IPv6 host that does not implement CMIPv6 (Client Mobile IPv6) stack. Note here that CMIP makes a terminal itself conduct mobile IP processing, which is an opposite idea of PMIP that makes any proxy node existing on the network side conduct mobile IP processing of a terminal as proxy.

In PMIPv6, location management signaling in a local domain is completely processed by a network, and therefore PMIPv6 is effective for a node implementing CMIPv6 stack as well. During global movement involving a change of a MN address, the MN has to use CMIP stack to transmit related location update signaling (e.g., BU signaling of MIPv6) to a HA and a CN. On the other hand, in the case of movement in a PMIPv6 local domain, MN understands that a prefix is not changed and the same prefix is kept, so that the MN does not conduct location registration signaling.

A prefix used by a MN in a PMIPv6 domain is acquired from a network managed by local mobility anchor (LMA), that is, the LMA serves as a logical anchor point of this prefix. In a local PMIPv6 domain, a MAG conducts location registration signaling to the LMA instead of the MN so as to associate a MN address (PMIPv6 domain address) in the PMIPv6 domain or a prefix provided to the MN with an address of an egress interface of the MAG itself. When detecting a connection of a MN, the MAG basically conducts, with respect to the LMA, appropriate proxy signaling similar to BU in MIPv6.

In the case where the home agent of the MN and the LMA are implemented by the same device, this PMIPv6 domain is the home domain of the MN, and the MN does not need to conduct signaling, so that the MN can receive original PMIPv6 services. On the other hand, in the case where the MN exists in a foreign PMIPv6 domain and a foreign prefix is provided to the MN, the MN has to provide a newly acquired address in the foreign PMIPv6 domain to the HA and the CN for updating. Herein, the operating range of this protocol is within a specific management domain, and such an operating range might expand over a large scale of range. For instance, a global PMIPv6 domain of a scale across the world can be formed by cooperation of a large number of operators.

When moving in a PMIPv6 domain, a MN acquires a local prefix. Normally, after being subjected to authorization by an AAA (Authorization, Authentication and Accounting) server, the MN is provided with a local prefix. The local prefix provided to the MN may be a prefix specific to each MN or may be a common prefix that is the same as the prefix of the LMA address. When a prefix specific to each MN is provided, an address is configured in a stateful or stateless address configuration mode. On the other hand, when a common prefix is provided to a MN, a stateful address configuration is more desirable so as to avoid a problem of overlapping addresses generated by the MN in the PMIPv6 domain.

A major drawback of PMIPv6 resides in that since a service thereof is provided in a local place of a global network, a MN attempting global movement (moving across PMIPv6 domains) has to use PMIPv6 and MIPv6 at the same time as described in the following Patent Document 3. Further, since a PMIPv6 service is limited to a local domain, global mobility cannot be achieved in a real sense for an IPv6 host unless different PMIPv6 domains cooperate with each other.

PMIPv6 further has a problem about route optimization of a moving IPv6 host. A CMIP node (i.e., a MN executing an operation based on MIP) can always execute RO with a CN at the time of address change. On the other hand, in order to allow an IPv6 host not having a RO function to conduct RO, support from another entity existing on a network is required. The following Non-Patent Document 4 discloses a method of achieving RO for an IPv6 host in a PMIPv6 domain. In the Non-Patent Document 4, a PMA conducts RO between an IPv6 host and a CN thereof.

Further, 3GPP (Third Generation Partnership Project) is discussing about a global heterogeneous network communication device having a communication function with various wireless access networks such as a wireless local area network (WLAN), a cellular network (3G) and a WiMAX type wireless wide area network (WWAN). Especially, they are discussing to realize seamless mobility in a heterogeneous network communication device and support for a plurality of application services requiring real-time video, VoIP, and a high QoS (Quality of Service) for important data.

As disclosed in the following Non-Patent Document 5, in order to allow user equipment (UE) to efficiently move in various local management domains (including various types of access networks and core networks), it is important for 3GPP to adapt to an appropriate mobility management mechanism.

In 3GPP, access networks can be categorized into: legacy 3GPP access networks (GPRS: General Packet Radio System/UMTS: Universal Mobile Telecommunications System); evolved 3GPP access networks; trusted non-3GPP access networks (trusted WiMAX access networks); and I-WLANs (interworking WLAN: enabling non-trusted access from WLAN via trusted gateway called e-PDG (evolved Packet Data Gateway)).

Non-Patent Document 5 describes that in 3GPP, PMIPv6 is the most appropriately used for a plurality of different types of network-based local mobility management. This is because, in addition to the above-described advantage specific to PMIPv6, even 3GPP legacy UE not implementing a MIPv6 function can realize network based local mobility management in a local place of a 3GPP network.

The following Patent Document 1 discloses a method of notifying a MN of two prefixes. Herein one of the prefixes notified to the MN is a local prefix, which is a prefix notified from an AR or a prefix related to an AR address. The other prefix is an address of a MA (Mobility Agent). Herein, a local network segment where the MN receives the MA address is called a local mobility domain.

The MN configures two care-of addresses based on the notified two prefixes. The addresses configured by the MN from the prefix related to the AR and the MA prefix (the prefix related to the MA address) are called a local address and a global address, respectively. Every time a sub-network is changed in a local domain, the MN generates a local care-of address, associates the local address with the global address of the MN and notifies the MA of the same. A HA or a CN is notified only when a mobility agent changes. Binding notified to the HA or the CN is binding between the home address of the MN and the global address of the MN.

The MONAMI6 (Mobile Nodes and Multiple Interfaces in IPv6) of IETF as disclosed in the following Non-Patent Document 6 provides a function of allowing a mobile node with a plurality of interfaces (multi-interface) to make full use of an advantage of multimode. The multi-interface node can register a plurality of care-of addresses acquired at its interfaces with a home agent. Thereby, the home agent can understand that a mobile node can be reached via a plurality of routes. Although according to the earlier MIPv6 standard, a home agent can register only one primary care-of address therein, this Non-Patent Document 6 discloses an additional option called a binding identifier (BID) provided to signaling to register a plurality of care-of addresses (MCoA: Multiple CoA), thus associating the plurality of care-of addresses with one home address. Herein, to register a plurality of care-of addresses for one home address is called MCoA registration.

The following Patent Document 2 discloses a method of realizing route optimization and location privacy (location concealment) in a hierarchical (local mobility and global mobility) mobility management environment. When a MN moves in a local mobility management segment under the control of a local mobility anchor, the MN registers a local care-of address thereof to a LMA or an AR operates as a proxy of the MN by a proxy method to register the local care-of address of the MN with the LMA. In the case of such local registration, the LMA is notified of a HA address of the MN. The LMA conducts binding update to notify a home agent of the MN of the LMA address as the care-of address of the MN. Thereby, a packet transmitted from the CN is received (intercepted) by the HA, and is tunneled to the LMA. When a proxy registration mode is valid, the LMA tunnels a packet to the MN or the AR.

Patent Document 2 further deals with a problem of route optimization. Herein, a gateway on the CN side (a gateway connecting with the CN) can make an inquiry about a current care-of address of a MN to a HA. In response to this inquiry, the HA makes a notification of the LMA address as the current care-of address of the MN. When the HA provides the LMA address, a tunnel is formed between the gateway node on the CN side and the LMA for route optimization.

In the technique disclosed in the following Patent Document 3, when a client or a MN requests an AR whether a sub-network is changed or not, the AR makes a notification of a home prefix only when the sub-network is changed. Thereby, the MN does not generate an address in response to a change of sub-network, thus avoiding interruption of a session.

Further, in the future a mobile node has a possibility of having a plurality of interfaces of different access types such as a WLAN interface, a 3G interface, and a WiMAX interface. Such a different types of plural interfaces can allow a MN to realize advantages of multihoming including load sharing, load balancing, cost down, priority setting to improve QoS, fault tolerance, and reliability. When a MN has a plurality of interfaces, each connecting with a foreign domain, the MN typically registers all care-of addresses with a HA, thus realizing multihoming support.

Non-Patent Document 6 further describes, for example, a method by a MN to register a plurality of care-of addresses (CoA) using a binding identifier (BID) option and a method of allowing a MN to execute bulk registration to a HA concerning binding of a plurality of interfaces using a single BU message.

For instance, in association with a MN 260A with a plurality of different types of interfaces as illustrated in FIG. 11A, location registration signaling has to be conducted plural times. Herein assume that the MN 260A in FIG. 11A is a 3GPP-compatible terminal configuring one or a plurality of home addresses originating from a 3GPP network or a 3GPP operator. Further assume that the MN 260A has two interfaces (interface 1 (IF1) and interface 2 (IF2). The IF1 of the MN 260A connects with a home PMIP domain 250A (MAG 265A), and the IF2 of the MN 260A connects with another foreign PMIP domain 251A (MAG 267A). Assume that these home PMIP domain 250A and foreign PMIP domain 251A further connect with the Internet 252A, and a CN 275A connecting with this Internet 252A has a packet communication session with the MN 260A.

In FIG. 11A, a home agent of MIPv6 for the MN 260A is a LMA/PDN-GW (LMA/PDN-GW/HA) 270A located in the home PMIP domain 250A. In FIG. 11A, the interface 1 of the MN 260A connects with the MAG 265A via wireless link, and the interface 2 of the MN 260A connects with the MAG 267A via a wireless link. Although the following describes based on such a scenario, those skilled in the art can read the description in various scenarios without limiting to this scenario. For instance, as an access technique for a connection between the MN 260A and the MAGs (MAG 265A and MAG 267A), any access techniques such as WLAN, WiMAX, and 3G can be used.

Assume that the MN 260A is supported by some multihoming. When existing in the home domain 250A, the MN 260A may set a common home address for the both interfaces, or may set different home addresses for the both interfaces.

In order to show a major problem in this scenario, assume herein that the MN 260A sets a common home address for the both interfaces of IF1 and IF2, and moves so as to change an access router for the IF1 and IF2 at the same time. The following describes such movement as a simultaneous movement of interfaces. Such a simultaneous movement may occur when the IF2 connects with a WLAN, and the IF1 connects with a small cell such as a WiMAX cell. Assume herein that, in the case of a simultaneous movement, the IF1 of the MN 260A connects with the MAG 265A and other MAGs in the home PMIP domain 250A. As a result of such connections, the MAG 265A (or the other MAGs in the home PMIP domain 250A with which the IF1 of the MN 260A connects) transmits proxy binding update (PBU) 280A to conduct binding between an egress address of the MAG 265A and a home prefix of the MN 260A.

Further, as a result of this simultaneous movement, the MN 260A configures a new care-of address for the IF2 using a unique prefix assigned for each MN by the LMA/PDN-GW 271A. Then, the MN 260A executes BU concerning CMIP through the IF2.

Non-Patent Document 6 further discloses an optimum method of registering a CoA of a MN with a HA by bulk registration conducted by the MN. The bulk registration transmits binding of a plurality of interfaces with one signaling message. Since the MN cannot understand what interface is an ideal one to conduct bulk registration, the bulk registration can be conducted at any interface of the MN. Herein, the ideal interface to conduct the bulk registration is the one enabling the MN to execute quick bulk registration. When one interface of the MN connects with a home domain and another interface connects with a foreign domain, a BU concerning CMIP with a "H" flag added thereto is transmitted from the interface connecting with the foreign domain.

The following Patent Document 4 discloses a method of, when a MN is in a sleep mode or in a not-reachable state, using a proxy server to receive a packet for the MN. According to this method, the MN is not forced to execute transmission of location update signaling to a HA, and can shift to a sleep mode and then acquire data from the proxy server.

The following Patent Document 5 discloses a method of executing fast handoff while coping with a problem concerning handoff such as delay and packet loss. In this case, fast handoff is achieved by transmitting a packet for a MN always to a group of a certain node irrespective of correct binding for the MN and a location of the MN. Before the MN connects with a new access router (AR), the new access router can receive a packet addressed to the MN. In the case where the MN does not connect with the new AR, the packet is abandoned by the AR. Even in the case where the MN connects with another AR, such a packet can be received.

According to the technique disclosed in Patent Document 5, in order to achieve fast handoff basically, a data packet of a MN is multicast to some AR group. That is, according to this method, a packet of a MN is transmitted to one or more base station nodes or access routers no matter whether the MN connects therewith or not. Since it is difficult to expect a precise location of the MN, a packet to be transmitted to the MN is passed to a base station node or proxy group.

The following Patent Document 6 discloses a method where a MN uses a proxy care-of address (proxy-related CoA) related to a foreign agent (FA) as a care-of address of its own. This proxy-related CoA is provided from the FA to the respective MNs. Such an address configuration enables not a MN but a foreign agent to execute encapsulation and decapsulation.

Further, when an AR implements a function of the FA, the method of using the proxy-related CoA as a CoA of the MN can eliminate throughput for encapsulation and decapsulation of tunneling in the MN, thus avoiding tunneling at a wireless link of a large load.

Patent Document 1: US Patent Application Publication No. 20040024901 A1
Patent Document 2: International Patent Application Publication No. WO06/012511
Patent Document 3: International Patent Application Publication No. WO07/050624

Patent Document 4: US Patent Application Publication No. 20040013099 A1

Patent Document 5: International Patent Application Publication No. WO03/090408

Patent Document 6: International Patent Application Publication No. WO02/065731

Non-Patent Document 1: Johnson, D. B., Perkins, C. E., and Arkko, J., "Mobility Support in IPv6", Internet Engineering Task Force Request For Comments 3775, June 2004.

Non-Patent Document 2: Gundavelli, S., et. al, "Proxy Mobile IPv6", Internet Engineering Task Force (IETF) Working Group Draft: draft-sgundave-mip6-proxymip6-02.txt, Mar. 5, 2007.

Non-Patent Document 3: Soliman, H., et. al., "Interactions between PMIPv6 and MIPv6: scenarios and related issues" Internet Engineering Task Force (IETF) Working Group Draft: draft-giaretta-netlmm-mip-interactions-00, Apr. 24, 2007.

Non-Patent Document 4: Qin, A., et. al., "PMIPv6 Route Optimization Protocol", Internet Engineering Task Force Working Group Draft: draft-qin-mipshop-pmipro-00.txt, Feb. 25, 2007.

Non-Patent Document 5: "3GPP System Architecture Evolution: Report on Technical Options and Conclusion", 3GPP TR 23.882, V1.9.0, Apr. 3, 2007.

Non-Patent Document 6: Wakikawa, R., et. al., "Multiple Care-of Addresses Registration", Internet Engineering Task Force Working Group Draft: draft-ietf-monami6-multiplecoa-02.txt, Mar. 5, 2007.

Referring now to FIG. 1, the following describes summary of the PMIPv6 protocol or a problem thereof in a 3GPP system. Herein, UE is a term used in 3GPP, while MN is a term used in IETF. In this specification, both mobile hosts (mobile terminals) of the above UE and MN are referred to as MNs (mobile nodes).

FIG. 1 illustrates an evolved 3GPP system configured with various public land mobile networks (PLMN). Access networks illustrated in FIG. 1 are non-trusted WLAN type networks. PLMN typically has a feature in the core networks and the access networks, and 3GPP introduces PMIPv6 also in such a PLMN. When the access networks of PLMN are an evolved 3GPP or legacy 3GPP type access networks, there is a high possibility that the PLMN is managed by a common operator and a router has an address configured with a common route prefix. On the other hand, when the MN tries to access a 3GPP core network via non-trusted WLAN, since a WLAN segment thereof may be managed by a different operator, the access network may directly connect with the Internet.

When a non-trusted 3GPP access or WLAN access is conducted, and in the case where the access network does not connect to the Internet directly or an end receiver of data traffic is located in a 3GPP core network, traffic required going through the 3GPP core network has to be routed through a trusted gateway called ePDG.

In order to describe a problem of the PMIPv6 protocol in a 3GPP system, assume that one operator manages one PLMN in FIG. 1. In FIG. 1, a PLMN 1 has a 3GPP core network 101 and an I-WLAN type access network (described as I-WLAN access network) 103.

The 3GPP core network 101 has a LMA/PDN-GW 50 and a local 3GPP AAA server 60. Assume herein that the LMA functions as a PDN-GW (Packet Data Network Gateway). The local 3GPP AAA server 60 has authorization information on a moving MN to authorize whether the MN can receive a service from the 3GPP core network 101 and a PMIPv6 service (if PLMN introduces PMIPv6).

The I-WLAN access network 103 of the PLMN 1 has an ePDG/MAG 40, an AR 20, and an AR 21. Assume herein that the ePDG has a MAG function. In a scenario of a non-trusted WLAN, the ePDG has to have a MAG function. This is because the ePDG is only one router that the 3GPP core network can trust among routers belonging to the WLAN. Assume further that the PLMN 1 introduces PMIPv6 and the MN 10 connects with this network. In this PLMN 1, the MN 10 connects with the AR 20.

Similarly, a PLMN 2 also has a 3GPP core network 102 and an I-WLAN access network 104, and the 3GPP core network 102 also has a LMA/PDN-GW 51 and a 3GPP AAA server 61. The I-WLAN access network 104 has ePDG/MAG/ARs 30 and 31. Assume herein that the ARs have functions of an ePDG and a MAG. In this PLMN 2, a MN 11 connects with the ePDG/MAG/AR 30. The PLMN 1 and the PLMN 2 (3GPP core networks 101 and 102) connect with a global communication network 100.

In the PLMN1 implementing PMIPv6, a prefix that the MN 10 receives at the time of connection with the I-WLAN access network 103 is an on-link prefix of the AR 20. This results from the AR 20 not implementing a MAG function (it is required to be implemented in a trusted 3GPP gateway ePDG). In this case, the MN 10 cannot understand whether this prefix is suitable for local breakout (packet transmission not going through the home domain of the MN 10 as described later) and route optimization (CoA registration with CN in mobile IP) or not. Even when the MN 10 can understand a property of this prefix (this prefix being an on-link prefix), since a PMIPv6 domain prefix is not acquired, there is a problem that the MN 10 cannot receive a PMIP service in this PLMN 1.

Note here that local breakout means that, when a MN connects with a foreign domain, the MN conducts a communication with a CN without using a route going back to a home domain, and means that when the MN connects with a domain of an operator other than the home domain, the MN conducts a communication (breakout) directly with a CN on the Internet from the foreign domain connecting therewith (if the foreign domain also configures a PMIP domain, via a LMA of the domain), although the communication originally has to go through a LMA (PDN/GW, for example) existing in the home domain to conduct a communication with the CN on the Internet. In this specification, the term of local breakout is further used in a wider sense so that local breakout can express a communication with a CN on the Internet while bypassing the home domain using a globally reachable address (from the Internet) regardless of whether home or foreign domain connecting with the MN and regardless of a type of an access network.

On the other hand, in the PLMN2 implementing PMIPv6, since the AR implements functions of a MAG and an ePDG, a prefix notified from the ePDG/MAG/AR 30 is a PMIPv6 domain prefix. In this case also, the MN 11 cannot understand whether this prefix is suitable for local breakout or not. When the MN 11 uses this prefix (PMIPv6 domain prefix), a communication conducted with a CN connecting with the same PMIPv6 domain (PLMN2) is via a LMA, so that RO cannot be achieved between the MN 11 and the CN.

Referring now to FIG. 2, the following describes a problem occurring when a MN moves in a PLMN implementing PMIPv6. In FIG. 2, assume that a MN 210 connects with a PMIPv6 domain 200 and this PMIPv6 domain is a home domain of the MN 210. Thus, in this case also, a LMA functions as a home agent (HA) of the MN 210. In 3GPP, a SAE (Service Architecture Evolution) anchor can function as a home agent of MIPv6, and also can function as a router implementing a LMA function. That is, in FIG. 2, a LMA/ HA/SAE anchor 230 has all functions as a LMA, a HA of the MN 210 and a SAE anchor.

Assume herein that the MN 210 conducts a communication with a CN 211 connecting with the same PMIPv6 domain 200. Assume further that the CN 211 enables RO (RO enabled) and joins to this PMIPv6 domain 200. RO enabled means that the CN 211 can execute RO of CMIP type. The MN 210 further conducts a communication with a CN 213 and a CN 212. Assume that the CN 213 is a RO enabled node existing on the Internet (or public packet data network) 201, and the CN 212 is a node not having a RO function.

Assume further that the MN 210 is a multihoming-enabled node that can configure a plurality of different addresses for one interface. When the MN 210 moves to this PMIPv6 domain 200 to connect with a MAG 220 as an access router and receives both of an on-link prefix and a PMIPv6 domain prefix of the MAG 220, the MN 210 has a possibility of configuring two addresses. For instance, since the MN 210 conducts a communication with a RO-enabled CN such as the CN 211 or the CN 213, the MN 210 may want to use a global prefix (on-link prefix) for route optimization. On the other hand, since the MN 210 exists in the home domain, the MN 210 may want to achieve optimized route in a communication with a legacy CN such as a CN 212 by configuring a home address using a home prefix thereof.

Such an address configuration will make the MN 210 conduct binding update for the home agent (LMA/HA/SAE anchor 230). This BU is of a CMIP type. Similarly, the MAG 20 transmits proxy binding update (PBU) to the LMA (LMA/ HA/SAE anchor 230) to associate a home address (PMIPv6 domain address) of the MN 210 with an address of an egress interface of the MAG 220. This BU is of a PMIP type.

FIG. 2 illustrates the BU transmitted from the MN 210 to the LMA/HA/SAE anchor 230 when the MN 210 connects with the MAG 220 with a signal 240. Meanwhile, FIG. 2 illustrates PBU transmitted from the MAG 220 to the LMA/ HA/SAE anchor 230 with a signal 241. Similarly when the MN 210 further moves in the PMIPv6 domain (e.g., connecting with a MAG 221 and a MAG 222), double BU signaling (BU signaling of CMIP and PBU signaling of PMIP) will occur. FIG. 2 illustrates such signaling related to movement of the MN 210 with BU signaling (signals 242, 244) and PBU signaling (signals 243, 245). As a result, the movement of the MN 210 (especially when the MN 210 moves fast) causes a series of signaling for a specific purpose (herein signaling related to BU and PBU) very often, resulting in consumption of resource for other communications, thus causing a status called signaling storm (BU storm) generating delay of a data packet and a lack of band.

When the MN 210 understands a global prefix for local breakout, the MN 210 can execute RO with the CN 211 and the CN 213. In this case, a data path subjected to route optimization will be paths 246 and 248. When conducting a communication with the CN 212, the MN 210 uses a PMIPv6 domain prefix. A data packet from the MN 210 to the CN 212 is transmitted to the MAG 220 and is tunneled from the MAG 220 to the LMA 230. The LMA 230 decapsulates a packet, and transmits the decapsulated packet to the CN 212.

As described above, the conventional technique has two types of problems. The first problem resides in that when an AR does not have functions of a MAG and an ePDG, there is a possibility of a MN moving in a PMIPv6 domain failing to understand a PMIPv6 domain prefix and in that when an AR has functions of a MAG and an ePDG, there is a possibility of the MN failing to understand an on-link global prefix. That is, in the conventional techniques, there is a problem that a MN cannot understand various prefixes (a plurality of prefixes) to be selected for efficient communications with various different types of CNs. The second problem resides in that even if a plurality of types of addresses (e.g., an address of a PMIP type and an address of a CMIP type) can be configured from a prefix that a MN can use, BU storm may occur due to double BU signaling (BU signaling and PBU signaling) as described above.

The above-described Patent Document 1 does not mention a problem as to what address is to be selected for local breakout. That is, the MN in Patent Document 1 can understand only an address (global address) used for a communication with a CN or a HA and an address (local address) used for location registration with a MA, and Patent Document 1 does not mention the problem as to what address (or prefix) is to be selected among a plurality of addresses (or prefixes) to achieve efficient communication (route optimization). Patent Document 1 does not mention a problem of route optimization in a local domain also. Since mobility is completely dealt by a MN, the above-described problem generating double signaling (the problem illustrated in FIG. 2) does not occur in the system described in Patent Document 1.

The above-described Patent Document 2 refers to route optimization between a gateway node on the CN side and the LMA. However, Patent Document 2 does not deal with a problem for route optimization under the control of the LMA. The technique disclosed in Patent Document 2 deals with local mobility management by a MN or an AR, and deals with global mobility management by a LMA. This is greatly different from the scenarios illustrated in FIG. 1 and FIG. 2 and a scenario for an operation of the present invention. Patent Document 2 never refers to a problem as to what address is to be used for local breakout. In the technique disclosed in Patent Document 2, an address that the MN understands is a local address only, and route optimization is dealt with by the LMA itself. That is, the technique disclosed in Patent Document 2 does not refer to a problem occurring when the MN selects various prefixes and addresses, and does not cope with the problems illustrated in FIGS. 1 and 2.

In the technique disclosed in the above-described Patent Document 3, since a home prefix only is provided to a MN, the MN does not conduct route optimization. Thus, a communication route is not optimized even with a CN, with which the MN can conduct an efficient communication by route optimization. Further, since only one prefix is provided and the MN does not need to select a prefix among a plurality of prefixes, the technique disclosed in Patent Document 3 does not cope with the problem illustrated in FIG. 1 to select a correct prefix.

According to the technique disclosed in Non-Patent Document 6, as illustrated in FIG. 11A, a length of a path 281A along which BU is transmitted concerning CMIP will be increased. In such a path 281A of a long length to transmit BU concerning CMIP, location updating for IF2 is conducted at a LMA/PDN-GW (LMA/PDN-GW) 271A, and therefore a BU packet of a CMIP type has to be transmitted via a foreign PMIP domain 251A and further via the Internet 252A.

Further, this BU packet has to be subjected to packet encapsulation from the MAG 267A to the LMA/PDN-GW 271A, and this encapsulation processing will further delay location updating.

In this way, according to the technique disclosed in Non-Patent Document 6, there are problems: the care-of address of IF2 is registered through a long length path in the scenario illustrated in FIG. 11A, thus leading to a problem of larger amounts of network resources used (the first problem related to Non-Patent Document 6); and location registration signaling concerning both interfaces of the MN 260A is conducted as indicated with the paths 280A and 281A of FIG. 11A, thus leading to the necessity of optimization to decrease signaling load in the network (the second problem related to Non-Patent Document 6). In the scenario disclosed in FIG. 11A, the MN 260A conducts updating (path 281A), whereas a fixed entity (MAG 265A) conducts another updating (path 280A) concerning location information.

As for a method using bulk registration disclosed in Non-Patent Document 6, a MN does not control all signaling, and there is a problem that the MN cannot transmit signaling of bulk registration in the scenario illustrated in FIG. 11A (the third problem related to Non-Patent Document 6). That is, in FIG. 11A, the MN 260A conducts location updating signaling of some interface, whereas the MAG 265A conducts location updating signaling of another interface. Even if the MN conducts signaling of bulk registration through IF2, it takes a long time for the bulk registration of interfaces to reach the LMA/PDN-GW 270A, so that the above-stated problem cannot be solved.

According to the technique disclosed in Patent Document 4, signaling to a HA will be decreased. However, a MN has to acquire data from a proxy server via a plurality of interfaces, so that the MN has to conduct some binding registration to the proxy server. There may be a method of allowing the MN to execute quick and optimized location registration with the proxy server for one or a plurality of interfaces. However, this provides a solution different from the technique of the present invention, and this specification does not describe it.

The following describes a scenario causing a handoff problem when a multi-interface MN moves in a home PMIP domain and a foreign PMIP domain. In FIG. 11B, assume that a MN 260B has two interfaces (IF1 and IF2) and the MN 260B connects with a home PMIP domain 250B through both of the interfaces in the initial state. Assume further that the MN 260B acquires one or a plurality of home prefixes from a LMA/PDN-GW (LMA/PDN-GW/HA) 270B. In the initial state, IF2 of the MN 260B connects with a MAG 266B, and IF1 of the MN 260E connects with another MAG (not illustrated in FIG. 11B) in the home PMIP domain 2508.

When IF2 of the MN connects with the MAG 266B via an access link, the MAG 266B transmits PBU 280B to conduct binding between the home prefix and an egress address (address of an egress interface) of the MAG 266B. This registration with the PBU 280B creates an entry at the LMA/PDN-GW 270B. The entry of binding cache by this registration is illustrated in a first entry in binding cache 271D of FIG. 11D.

Assume that immediately after moving to connect with the MAG 265B via an access link, IF1 moves away from the home PMIP domain 250B and connects with a foreign domain (access domain) 251B via an access link. Assume further that the home PMIP domain 250B and the foreign domain 251B connect with the Internet 252B. Herein, the home PMIP domain 250B can be configured with a plurality of different types of access networks. The foreign domain 251B may be or may not be configured with architecture based on PMIP.

When IF1 of the MN 260B moves to connect with an AR 267B, the MN 260B configures a care-of address for IF1 and thereafter executes BU (via a path 282B) of CMIP with respect to the LMA/PDN-GW 270B. This BU via the path 282B may reach the LMA/PDN-GW 2708 earlier than PBU 281B from the above-stated MAG 265B.

In such a case, an entry in the binding cache 271D for IF1 as illustrated with a second entry in the binding cache 271D of FIG. 11D is created at the LMA/PDN-GW 270B.

Herein, an interface is identified with an interface identifier, and as illustrated in FIG. 11D, the binding cache 271D includes a parameter of the interface identifier (IF-ID/BID). Binding cache keeps an entry for PBU of PMIP or BU of CMIP concerning any and each interface.

When the PBU 281B reaches the LMA/PDN-GW 270B from the MAG 265B later than the BU of CMIP via the path 282B, this PBU 281B overwrites a correct BU entry of CMIP (the second entry in the binding cache 271D of FIG. 11D), resulting in a third entry created in the binding cache 271D of FIG. 11D.

When such entry registration of wrong reaching order occurs, and in the case where the LMA/PDN-GW 270B assigns a common prefix to both of the interfaces of the MN 260B, packet reachablity via IF1 cannot be achieved until correct binding arrives from IF1 of the MN 260B. In such a case of assigning a common prefix, no packet is transmitted via IF1, and only packet transmission via IF2 is possible.

On the other hand, when the LMA/PDN-GW 270B gives a unique prefix to each interface of the MN, the MN 260B may configure a different and unique home address using each prefix. When a wrong binding cache entry for IF1 occurs in the case of assigning a plurality of prefixes, a data packet to be delivered to a home address configured in IF1 will not reach the MN 260B until correct binding for IF1 is established at the LMA/PDN-GW 270B.

Basically, until another correct BU of CMIP reaches the LMA/PDN-GW 270B, packet loss due to handoff for IF1 and handoff delay will occur. Such packet loss and handoff delay will degrade QoS quality of a flow sensitive to delay and data flow of important information.

The technique disclosed in Patent Document 5 may solve the above-stated problem illustrated in FIG. 11B. However, this technique multicasts a data packet, and therefore large amounts of network resources are required, thus wasting network resources.

In order to access a 3GPP core network in a non-trusted WLAN access, a packet has to be transmitted via a trusted gateway called ePDG. However, since the ePDG is a router existing in a WLAN access domain located higher in rank in a routing hierarchy, the ePDG is not always a direct access router for a MN in such a network configuration. In such a network configuration of the ePDG, when a MN receives prefixes of different types, the MN can select an appropriate prefix to configure a CoA for route optimization with a CN, depending on a location of the CN and a location on the network.

In FIG. 11C, a MN 205C connects with a home PMIP domain 202C via a non-trusted WLAN access network (non-trusted WLAN) 203C and conducts communications with two CNs (CN 210C and CN 211C). The CN 210C connects with an AR 217C located in the WLAN access network 2030. On the other hand, the CN 211C connects directly with a MAG 221C, and is located in a trusted WLAN access network (trusted WLAN) 200C. The home PMIP domain 202C connects directly with the Internet 201C.

Assume that in the initial state the MN 2050 connects with an AR 2150 and moves as in a trace 206 of FIG. 11C. When the MN 205C decides to use a home address to communicate with some CN (not illustrated), then the MN 205C firstly tunnels a data packet to an ePDG/MAG 220C. This data packet is decapsulated by the ePDG/MAG 2200, and is further tunneled to a LMA/PDN-GW (LMA/PDN-GW/HA) 230C as a HA of the MN 2050.

In this PMIP core network (home PMIP domain 2020), a GW 231C further exists, and assume that this GW 231C is located lower in rank in the routing hierarchy than the LMA/

PDN-GW 230C. Basically, this GW 2310 can conduct some policy and execute an AAA service (e.g., accounting management) with respect to a MN accessing the 3GPP core network. Assume further that the GW 231C connects with the Internet 201C. A packet from the MN 205C can be tunneled via the GW 231C in accordance with policy set at the GW 231C.

In such a scenario, the MN 2050 may receive two types of prefixes. For instance, one of the two types of prefixes may be a logically correct on-link prefix provided from the AR 2150, and the other type may be a home prefix of PMIP transmitted from the ePDG/MAG 220C when the MN 2050 establishes tunnel with the ePDG/MAG 220C. Signaling 240C of FIG. 11C illustrates two prefixes received from the AR 215C. These two prefixes are received at the MN 205C at different timings.

If the CNs configure their care-of addresses using a prefix of the PMIP domain, the MN 205C can understand that these two CNs are located in the same PMIP domain as the MN 205C to conduct route optimization signaling (e.g., signaling according to a RR test) with the CN 2100 and the CN 211C. In such a case, the MN 205C may use an on-link prefix generated by the AR 215C to establish a route optimization session with the above-stated CN 210C and CN 2110.

A problem occurring when such an on-link prefix is used resides in that, in the case where the access domain (WLAN access network) 203C is quite wide and a large number of ARs exist therein, the MN 205C may have to configure a different care-of address every time the MN 205C connects with a different AR in the WLAN access network 203C, and starts a route optimization session with a CN. Further, when the MN 2050 configures a care-of address at each AR location in the access network 203C, the MN 205C has to transmit binding to associate such a care-of address with a HoA to the HA 230C for updating, whereby signaling load in the PMIP core network (home PMIP domain 2020) will increase.

Further, these location registration signaling packets are tunneled to the ePDG/MAG 220C and decapsulated, and then sent out to the LMA/PDN-GW (LMA/PDN-GW/HA) 230C. When the MN 2050 connects with the AR 215C, the location registration signaling is transmitted as illustrated in paths 241C and 243C. On the other hand, when the MN 205C connects with the AR 216C, the location registration signaling is transmitted as illustrated in paths 242C and 244C.

When the ePDG/MAG 220C provides the MN 205C with a home prefix, the ePDG/MAG 220C can update binding concerning PMIP in the LMA/PDN-GW/HA 230C. Note here FIG. 11C does not illustrate this case. A problem in this case is that since a large number of ARs exist in the access domain (WLAN access network) 203C, an on-link prefix may not be in an ideal state and another prefix may have to be searched.

According to the technique disclosed in Patent Document 6, although load on tunneling from a MN to an AR via a wireless path can be decreased, the problem illustrated in FIG. 11C cannot be solved.

DISCLOSURE OF THE INVENTION

In view of the above-stated problems, it is an object of the present invention to, when a mobile terminal moves in a PMIP domain, enables an access router to provide the mobile terminal with various selectable prefixes. It is another object of the present invention to allow a mobile terminal to select an address type to be configured from an available prefix and conduct a communication with a correspondent node while optimizing a route without signaling load on the PMIP domain.

In order to achieve the above-stated objects, a communication control method of the present invention is in a communication system that configures a network domain implementing a network-based local mobility management protocol, the communication system including: a location management node having a function of managing location information of a mobile terminal connecting with the network domain; a proxy registration node having a function of registering location information of the mobile terminal as a proxy; and an authorization server that authorizes the mobile terminal. The communication control method includes the steps of: a step where a mobile terminal with the network domain as a home domain acquires a plurality of prefixes; a step where the mobile terminal acquires a plurality of addresses from the plurality of prefixes; a step where the mobile terminal notifies the network domain of the plurality of addresses; and a step where the proxy registration node registers, with the location management node, binding information on each of the plurality of addresses notified from the mobile terminal.

With this method, the mobile terminal can appropriately use addresses configured with a plurality of prefixes. Further, the mobile terminal appropriately uses the addresses configured with available plural prefixes, thus achieving optimized route for a communication with a correspondent node without signaling load on a PMIP domain.

In addition to the above-stated processing, the communication control method of the present invention includes: a step where the mobile terminal makes a request, when connecting with the network domain, of a plurality of prefixes; and a step where the proxy registration node processes so that the plurality of prefixes are notified to the mobile terminal based on the request of the plurality of prefixes.

With this method, when the mobile terminal moves in a PMIP domain, an access router can provide the mobile terminal with a plurality of prefixes.

In addition to the above-stated processing, in the communication control method of the present invention, the prefix acquisition step includes the steps of: a step where the mobile terminal requests, when connecting with the network domain, the plurality of prefixes from an access router providing a connection with the network domain to the mobile terminal; a step where the access router passes a request for the plurality of prefixes to the proxy registration node and the proxy registration node requests the authorization server to authorize the mobile terminal; a step where, after confirming a qualification of the mobile terminal to connect with the network domain, the authorization server assigns a domain prefix to the mobile terminal, notifies the proxy registration node of the domain prefix, and instructs the proxy registration node to notify the mobile terminal of the plurality of prefixes; and a step where the proxy registration node notifies the mobile terminal of the domain prefix via the access router and makes the access router make a notification of a global prefix based on a notification instruction of the plurality of prefixes from the authorization server. The address notification step includes a step where the mobile terminal acquires a home address including the domain prefix and a global address including the global prefix. The address notification step includes a step where the mobile terminal notifies the access router of the home address and the global address, and the access router passes the home address and the global address to the proxy registration node. The binding registration step includes a step where the proxy registration node registers first binding information and second binding information with the location management node, the first binding information associating the home address or the domain prefix with an address or a prefix of the proxy registration node itself, and the second binding information associating the home address with the global address.

With this method, the present invention is applicable even to the case where a MAG (and an ePDG) is not implemented on an AR. That is, when a mobile terminal moves in a PMIP domain, an access router can provide the mobile terminal with a plurality of prefixes, so that the mobile terminal can appropriately use addresses configured with these plurality of prefixes. Further, the mobile terminal appropriately uses the addresses configured with available plural prefixes, thus achieving optimized route for a communication with a correspondent node without signaling load on a PMIP domain.

In addition to the above-stated processing, in the communication control method of the present invention, when an access router connecting with the mobile terminal does not have a function as the proxy registration node, the access router relays information transmitted between the mobile terminal and the proxy registration node, and makes a notification of an on-link prefix unique to the access router.

With this method, when a MAG (and an ePDG) is not implemented on an AR, the mobile terminal can be notified of an on-link prefix unique to the AR. Herein, the access router may make a notification of an on-link prefix in response to a request from the mobile terminal, or may make a notification thereof in accordance with an instruction from the authorization server (local serer) or a MAG, or at any timing.

In addition to the above-stated processing, in the communication control method of the present invention, when the mobile terminal has a plurality of interfaces and at least one of the plurality of interfaces connects with a foreign network domain, the address notification step includes a step where the mobile terminal notifies the home domain from a communication interface connecting with the home domain of an address set corresponding to a communication interface connecting with the foreign network domain.

With this method, binding update of a mobile terminal connecting with a foreign domain can be conducted via an interface connecting with a home domain.

In addition to the above-stated processing, in the communication control method of the present invention, the binding registration step includes a step where the proxy registration node registers binding information relating to an address of the mobile terminal set corresponding to the communication interface connecting with the foreign network domain with the location management node.

With this method, binding update of a mobile terminal connecting with a foreign domain can be conducted via an interface connecting with a home domain.

In addition to the above-stated processing, in the communication control method of the present invention, the address notification step includes a step where when notifying the home domain of the address from the communication interface connecting with the home domain, the mobile terminal requests to soon register the address with the location management node.

With this method, when binding update of a mobile terminal connecting with a foreign domain is conducted via an interface connecting with a home domain, quick registration processing can be realized.

In addition to the above-stated processing, in the communication control method of the present invention, the address notification step includes a step where the mobile terminal confirms existence of a communication interface connecting with the home domain.

With this method, when binding update of a mobile terminal connecting with a foreign domain is conducted via an interface connecting with a home domain, the mobile terminal can confirm the existence of an interface connecting with the home domain and then make an address notification.

In addition to the above-stated processing, in the communication control method of the present invention, the address notification step includes a step where when notifying the home domain of the address from the communication interface connecting with the home domain, the mobile terminal requests to add time information representing a notification time of the address to the binding information relating to the address and notify the location management node of the same.

With this method, the location management node can be surely notified of time information as an index indicating a transmission order of binding update of a mobile terminal connecting with a foreign domain.

In order to achieve the above-stated objects, a network node of the present invention functions as a proxy registration node in a communication system that configures a network domain implementing network-based local mobility management protocol, the communication system including: a location management node having a function of managing location information of a mobile terminal connecting with the network domain; a proxy registration node having a function of registering location information of the mobile terminal as a proxy; and an authorization server that authorizes the mobile terminal. The network node includes: means that receives from the mobile terminal a plurality of prefixes configured by the mobile terminal with the network domain as a home domain based on a plurality of prefixes; and means that registers, with the location management node, binding information relating to each of the plurality of addresses notified from the mobile terminal.

With this configuration, the mobile terminal can appropriately use addresses configured with a plurality of prefixes. Further, the mobile terminal appropriately uses the addresses configured with available plural prefixes, thus achieving optimized route for a communication with a correspondent node without signaling load on a PMIP domain.

In addition to the above-described configuration, the network node of the present invention further includes: means that receives a request from the mobile terminal of the plurality of prefixes; and means that processes so that the plurality of prefixes are notified to the mobile terminal based on the request from the mobile terminal of the plurality of prefixes.

With this configuration, when the mobile terminal moves in a PMIP domain, an access router can provide the mobile terminal with a plurality of prefixes.

In addition to the above-described configuration, the network node of the present invention further includes: means that, when the request of the plurality of prefixes from the mobile terminal is received and authorization of the mobile terminal is requested to the authorization server, and if the authorization succeeds, receives a domain prefix assigned to the mobile terminal from the authorization server and receives, from the authorization server, an instruction to notify the mobile terminal of the plurality of prefixes.

With this configuration, the authorization server can determine whether a plurality of prefixes can be notified to the mobile terminal or not.

In addition to the above-described configuration, the network node of the present invention further includes: means that selects the plurality of prefixes notified to the mobile terminal from the domain prefix, an on-link prefix of a connection point of the mobile terminal and an address or a prefix of the registration proxy node.

With this configuration, a notification of a plurality of prefixes can be made from the network node to the mobile terminal so as to realize optimization of a communication route depending on various situations.

In addition to the above-described configuration, the network node of the present invention further includes means that uses, as the binding information of the mobile terminal registered with the location management node, first binding information and second binding information, the first binding information associating the home address or the domain prefix with an address or a prefix of the proxy registration node itself, and the second binding information associating the home address with the on-link address.

With this configuration, both of PMIP binding information and CMIP binding information can be registered.

In addition to the above-described configuration, the network node of the present invention further includes means that, when the binding information relating to each of the plurality of addresses notified from the mobile terminal is registered with the location management node, generates one registration message including the binding information relating to each of the plurality of addresses notified from the mobile terminal and transmits the same to the location management node.

With this configuration, a plurality of pieces of binding information (e.g., PMIP binding information and CMIP binding information) can be registered with a registration message transmitted once.

In addition to the above-described configuration, the network node of the present invention further includes means that sets priority for use in the location management node with respect to the binding information relating to each of the plurality of addresses.

With this configuration, binding information to be referred to by priority in the location management node can be designated.

In addition to the above-described configuration, the network node of the present invention further includes means that, when the mobile terminal comprises a plurality of interfaces and at least one of the plurality of interfaces connects with a foreign network domain, receives from the mobile terminal a notification of an address set corresponding to a communication interface connecting with the foreign network domain.

With this configuration, binding update of a mobile terminal connecting with a foreign domain can be conducted via an interface connecting with a home domain.

In addition to the above-described configuration, the network node of the present invention further includes means that receives, together with the notification of the address, information from the mobile terminal requesting to soon register binding information relating to the address with the location management node.

With this configuration, when binding update of a mobile terminal connecting with a foreign domain is conducted via an interface connecting with a home domain, quick registration processing can be realized.

In addition to the above-described configuration, in the network node of the present invention, the binding registration means adds time information representing a notification time of the address to the binding information relating to the address notified from the mobile terminal and registers the same with the location management node.

With this method, the location management node can be notified of time information as an index indicating a transmission order of binding update of a mobile terminal connecting with a foreign domain.

In addition to the above-described configuration, the network node of the present invention further includes means that receives, from the mobile terminal, information requesting to add the time information representing a notification time of the address to the binding information relating to the address.

With this method, the location management node can be notified of time information as an index indicating a transmission order of binding update of a mobile terminal connecting with a foreign domain.

In order to achieve the above-stated objects, a mobile terminal of the present invention is connectable with a communication system that configures a network domain implementing network-based local mobility management protocol, the communication system including: a location management node having a function of managing location information of a mobile terminal connecting with the network domain; a proxy registration node having a function of registering location information of the mobile terminal as a proxy; and an authorization server that authorizes the mobile terminal. The mobile terminal with the network domain as a home domain includes: means that acquires a plurality of prefixes; means that acquires a plurality of addresses from the plurality of prefixes; and means that notifies the plurality of addresses and registers binding information relating to each of the plurality of addresses with the movement management node in the network domain.

With this configuration, the mobile terminal can appropriately use addresses configured with these plurality of prefixes. Further, the mobile terminal appropriately uses the addresses configured with available plural prefixes, thus achieving optimized route for a communication with a correspondent node without signaling load on a PMIP domain.

In addition to the above-described configuration, in the mobile terminal of the present invention, the means that acquires a plurality of prefixes includes: means that makes a request of a plurality of prefixes when connecting with the network domain; and means that receives the plurality of prefixes notified in response to the request of the plurality of prefixes.

With this configuration, when the mobile terminal moves in a PMIP domain, an access router can provide the mobile terminal with a plurality of prefixes.

In addition to the above-described configuration, the mobile terminal of the present invention further includes means that configures, from a domain prefix and a global prefix received in response to a request of the plurality of prefixes, a home address including the domain prefix and a global address including the global prefix.

With this configuration, the mobile terminal can configure a plurality of addresses (both of address based on PMIP and address based on CMIP).

In addition to the above-described configuration, the mobile terminal of the present invention further includes means that generates a message to make a notification of both of the home address and the global address and transmits the message to an access router connecting with the mobile terminal.

With this configuration, simply by processing to transmit a message to an access router, a mobile terminal can register a plurality of addresses of the mobile terminal.

In addition to the above-described configuration, the mobile terminal of the present invention further includes means that, in a state where the mobile terminal connects with the home domain, decides to use a home address configured with a domain prefix among the plurality of prefixes for communications with the legacy correspondent node and a correspondent node existing in another network domain.

With this configuration, in a state where the mobile terminal connects with the home domain, a communication route with a legacy correspondent node or a correspondent node existing in another network domain can be optimized.

In addition to the above-described configuration, the mobile terminal of the present invention further includes means that, in a state where the mobile terminal connects with the home domain, decides to use an on-link address configured with an on-link prefix among the plurality of prefixes for a communication with a correspondent node connecting with the same home domain.

With this configuration, in a state where the mobile terminal connects with the home domain, a communication route with a correspondent node connecting with the same home domain can be optimized.

In addition to the above-described configuration, the mobile terminal of the present invention further includes means that, in a state where the mobile terminal connects with the home domain, decides to use an address or a prefix of the registration proxy node among the plurality of prefixes for a communication with a correspondent node connecting with the same home domain.

With this configuration, in a state where the mobile terminal connects with the home domain, a communication route with a correspondent node connecting with the same home domain can be optimized.

In addition to the above-described configuration, the mobile terminal of the present invention further includes means that, in a state where the mobile terminal connects with a foreign domain different from the home domain, decides to use a foreign domain prefix address configured with a foreign domain prefix notified from the foreign domain for a communication with a correspondent node existing in a domain different from the foreign domain.

In addition to this configuration, in a state where the mobile terminal connects with a foreign domain different from the home domain, a communication route with a correspondent node existing in a domain different from the foreign domain can be optimized.

In addition to the above-described configuration, the mobile terminal of the present invention further includes means that, in a state where the mobile terminal connects with a foreign domain different from the home domain, decides to use a foreign domain prefix address configured with a foreign domain prefix notified from the foreign domain for route optimization processing in a communication with a correspondent node existing in the foreign domain.

With this configuration, in a state where the mobile terminal connects with a foreign domain different from the home domain, a communication route with a correspondent node existing in a foreign domain can be optimized.

In addition to the above-described configuration, the mobile terminal of the present invention further includes a plurality of communication interfaces. When at least one of the plurality of communication interfaces connects with a foreign network domain, the address notification means notifies the home domain of an address set corresponding to the communication interface connecting with the foreign network domain from a communication interface connecting with the home domain.

With this configuration, binding update of a mobile terminal connecting with a foreign domain can be conducted via an interface connecting with a home domain.

In addition to the above-described configuration, in the mobile terminal of the present invention, when the address notification means notifies the home domain of the address from the communication interface connecting with the home domain, the address notification means requests to soon register the address with the location management node.

With this configuration, when binding update of a mobile terminal connecting with a foreign domain is conducted via an interface connecting with a home domain, quick registration processing can be realized.

In addition to the above-described configuration, in the mobile terminal of the present invention, the address notification means confirms existence of a communication interface connecting with the home domain.

With this configuration, when binding update of a mobile terminal connecting with a foreign domain is conducted via an interface connecting with a home domain, the mobile terminal can confirm the existence of an interface connecting with the home domain and then make an address notification.

In addition to the above-described configuration, in the mobile terminal of the present invention, when the address notification means notifies the home domain of the address from the communication interface connecting with the home domain, the address notification means requests to add time information representing a notification time of the address to the binding information relating to the address and notify the location management node of the same.

With this configuration, the location management node can be surely notified of time information as an index indicating a transmission order of binding update of a mobile terminal connecting with a foreign domain.

The present invention is configured as stated above, having an effect of, when a mobile terminal moves in a PMIP domain, enabling an access router to provide the mobile terminal with various selectable prefixes. The present invention is configured as stated above, having another effect of allowing a mobile terminal to select an address type to be configured from an available prefix and conducting a communication with a correspondent node while optimizing a route without signaling load on the PMIP domain.

BRIEF DESCRIPTION OF THE DRAWINGS

FIG. 11D illustrates exemplary binding cache to describe a problem in the conventional technique.

BEST MODE FOR CARRYING OUT THE INVENTION

Figure 1:
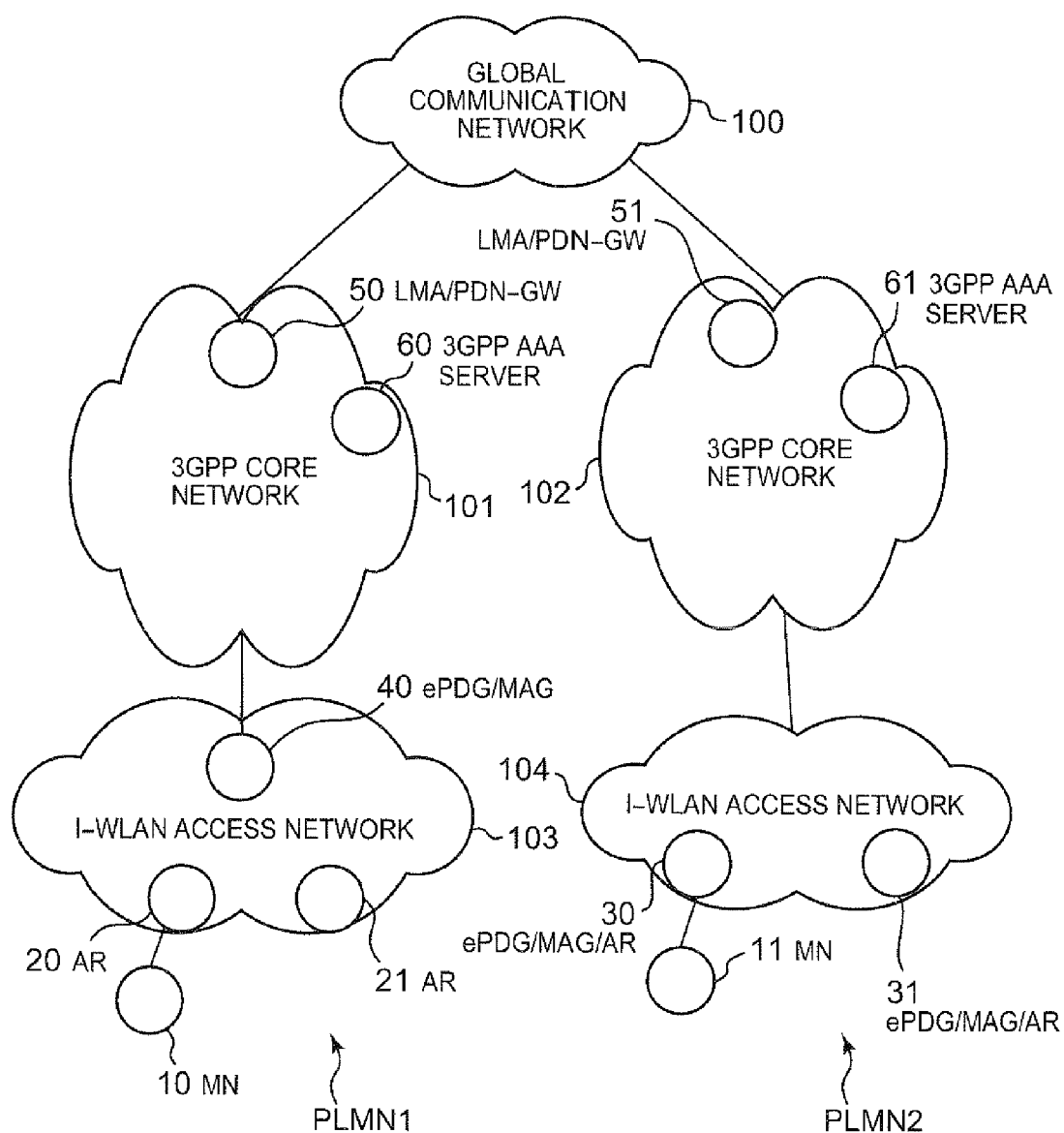
FIG. 1 illustrates an exemplary network configuration to describe an embodiment of the present invention and the conventional technique.
Figure 2:
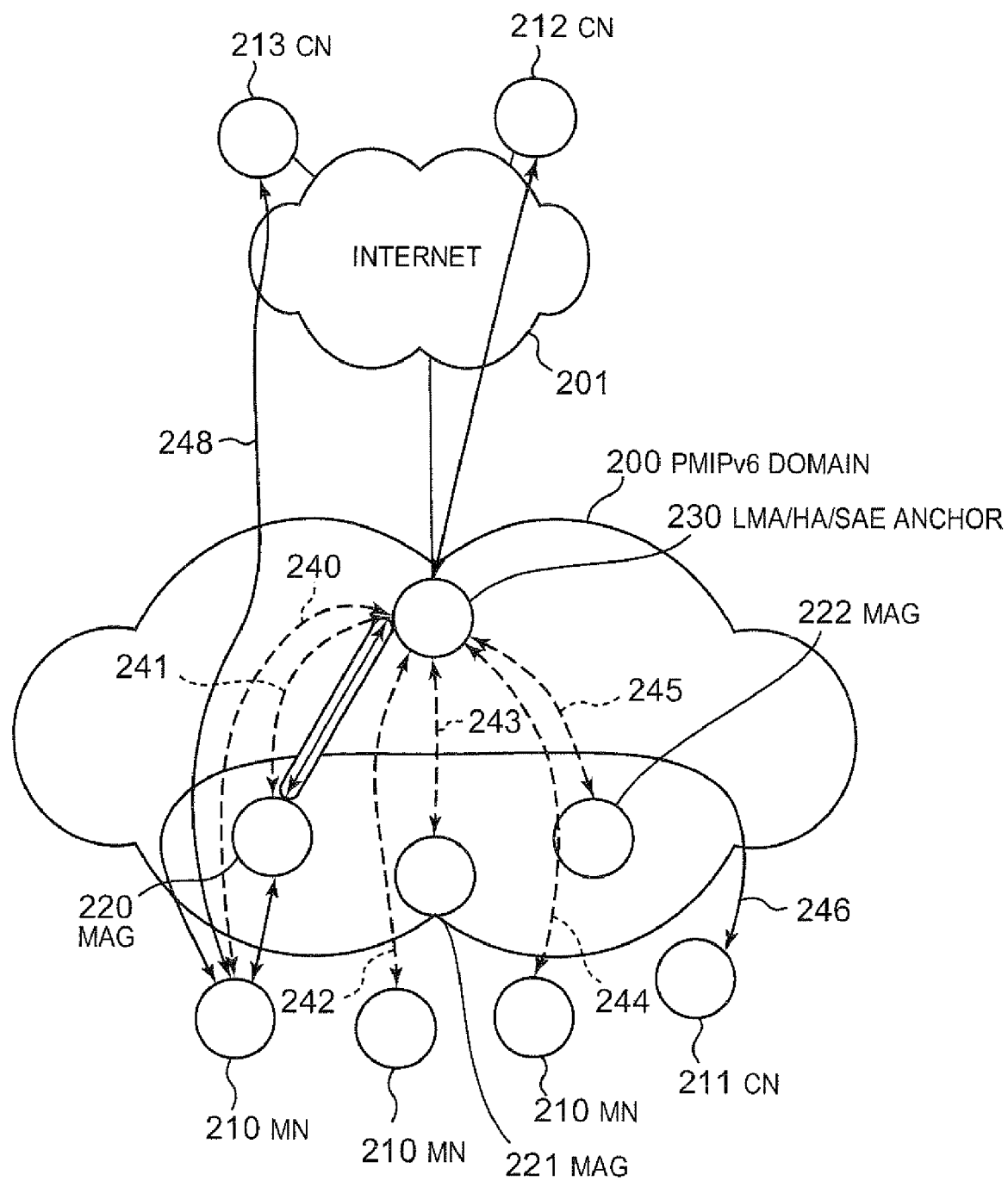
FIG. 2 illustrates a first exemplary network configuration to describe a problem in the conventional technique.

The following describes embodiments of the present invention, with reference to the drawings. In the following, two major methods according to the present invention are disclosed.

According to a first method of the present invention, when a MN in a PMIPv6 domain disposed in a 3GPP public mobile network conducts communications with a plurality of different types of CNs, the MN can understand a plurality of different types of prefixes enabling route optimization for the respective communications.

For instance, when the PMIPv6 domain is a home domain of the MN (when the MN exists in a home PMIPv6 domain), the MN requires a home prefix to conduct a communication with a legacy CN, the Internet and a RO-enabled CN connecting with another PMIPv6 domain. The MN further requires an on-link global prefix to execute RO with a RO-enabled CN in the home PMIPv6 domain of the MN. On the other hand, when the MN exists in a foreign PMIv6 domain, the MN requires a PMIPv6 domain prefix to execute RO with a RO-enabled CN existing in another domain and requires an on-link prefix to execute RO with a CN existing in the same foreign PMIPv6 domain. Further, it may be better to use another (or one used for another purpose) prefix for more optimized RO to execute RO, depending on a locational relationship with a CN.

When the MN understands the necessity of different types of prefixes, the MN makes an inquiry to an AR to acquire various prefixes. When the AR has a function as a MAG also, the AR makes an inquiry to an AAA server. When the AAA server notices that the MN joins to a PMIPv6 domain, the AAA server provides the AR (i.e., MAG) with different types of prefixes, while requesting the MN to provide appropriate information on these prefixes. The MN uses information on various types of prefixes to configure various types of addresses, and conducts communications with the respective types of CNs using appropriate types of addresses.

According to a second method of the present invention, a MN existing in a home PMIPv6 domain where a LMA and a HA coexist (LMA and HA are implemented by a common node) decides to configure an on-link care-of address for local breakout, and requests an AR to pass this care-of address to a MAG to allow the MAG to transmit a signal registration message to the LMA/HA of the MN. This registration message transmitted from the MAG to the LMA/HA associates a home address with a care-of address of the MN as GIMP binding, and associates a HoA of the MN with an address of an egress interface of the MAG as PMIP binding. This registration message preferably has a flag in a BU mobility header, indicating that the MN concurrently connects with a home as well.

Such binding enables a packet to a home address of the MN to be transmitted via an address (address of the egress interface of the MAG) designated by the PMIP binding. When some load balancing effect is to be obtained, the MAG may request the LMA/HA to pass a packet directly to the care-of address of the MN based on an attribute of the CMIP binding.

Figure 3:
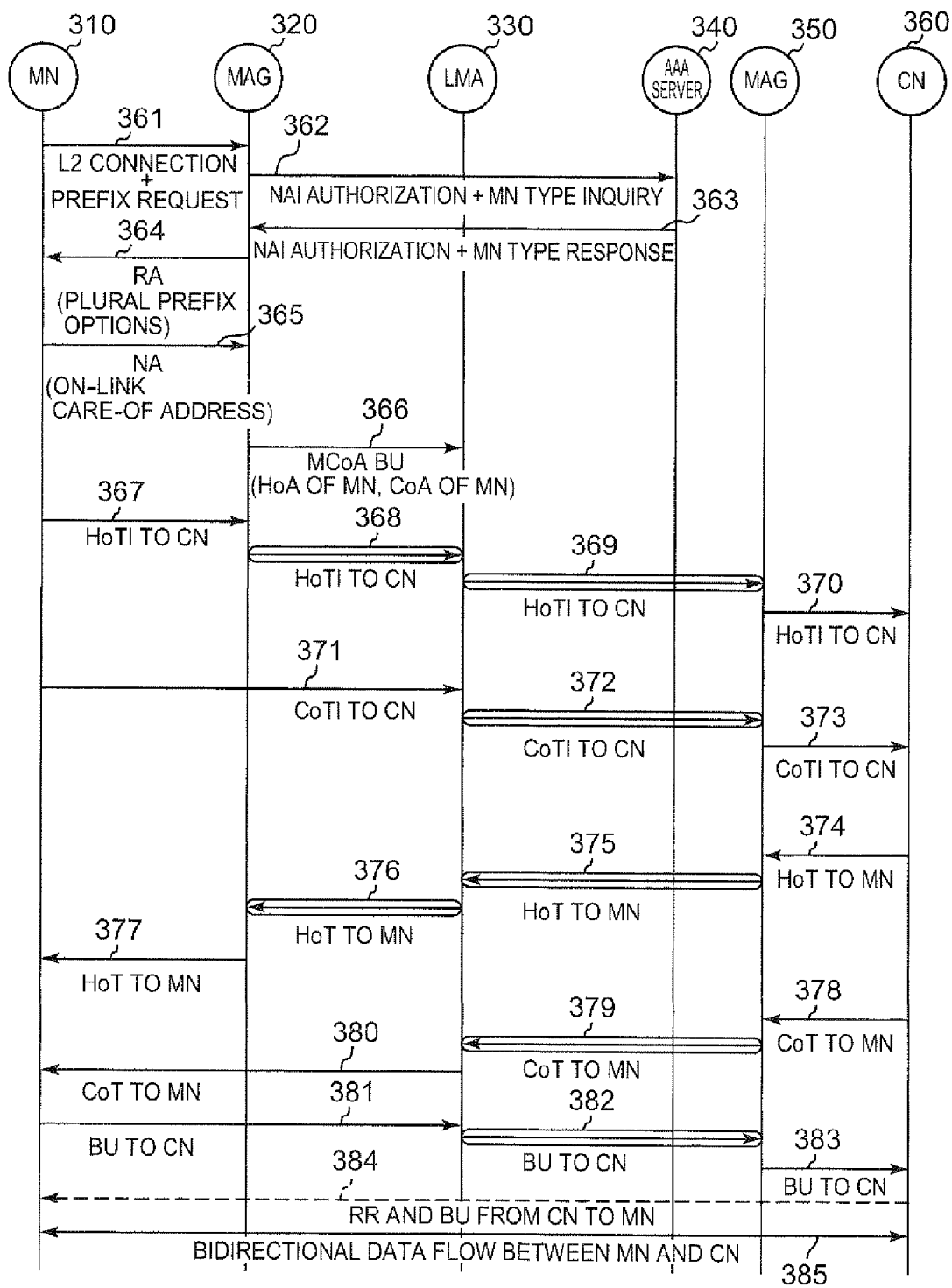
FIG. 3 is a sequence chart illustrating an exemplary operation in one embodiment of the present invention.

Referring now to FIG. 3, the following describes the above-described methods according to the present invention. FIG. 3 is a sequence chart illustrating an exemplary operation in one embodiment of the present invention. The following describes the case where a MN connects with a PMIPv6 domain as a home domain of the MN and conducts a communication with a RO-enabled CN. Herein, this RO-enabled CN joins to the same PMIPv6 domain as the MN and currently exists in the same PMIPv6 domain as the MN. A home domain of this CN is another domain (domain different from the home PMIPv6 domain of the MN). An AR implements a MAG function.

In FIG. 3, a MN 310 directly connects with a MAG 320, and a CN 360 directly connects with a MAG 350. All of these nodes exist in the PMIPv6 domain to which a LMA 330 and a MAG in the domain provides a PMIP service. An AAA server 340 in the PMIPv6 domain has a function of authorizing the provision of a PMIP service to the MN. This domain may be a 3GPP cellular domain or a domain of a 3GPP WLAN domain, or may be any other types of domains.

The MN 310 makes a layer 2 connection (L2 connection) with a sub-network connecting with the MAG 320, and requests an available prefix with a message 361 (L2 connection+prefix request). The MAG 320 extracts a network access identifier (NAI) of the MN 310 from the message 361. Herein, the NAI may be a value capable of specifying the MN 310 such as a media access control (MAC) identifier. The MAG 320 passes the extracted NAI to the AAA server 340, and the AAA server 340 conducts authorization. This inquiry from the MAG 320 to the AAA server 340 is indicated with a message 362 (NAI authorization+MN type inquiry).

When receiving this message 362, the AAA server 340 understands that the MN 310 installs CMIP client stack, for example (e.g., refer to status information configured beforehand) and makes a response to the MAG 320. This response is indicated with a message 363 (NAI authorization+MN type response). The present invention does not limit especially a method of making the AAA server 340 understand that the MN 310 requires a plurality of different type prefixes. For instance, when the MN 310 connects with the PMIPv6 domain first, the MN 310 requests a plurality of different types of prefixes to the network side, the network side provides a plurality of different types of prefixes in response to this request, and the AAA server 340 may keep status information indicating that this MN 310 requires a plurality of different types of prefixes in a PMIP cache entry. Thereby, when the MN 310 connects with the PMIPv6 domain later, the AAA server 340 can refer to this status information and provide the MN 310 with a plurality of different types of prefixes. Along with the status information, information concerning what type of prefix is required may be kept. Further, when a contract is made indicating the MN 310 receiving a PMIPv6 domain service, it may be determined to conduct a service of providing a plurality of different types of prefixes, which may be set in the AAA server 340 as status information beforehand.

This message 363 contains various types of information. Firstly, this message 363 conveys a prefix of the PMIPv6 domain assigned to the MN 310. Secondly, this message 363 conveys information indicating that provision of a PMIPv6 service is approved. Thirdly, this message 363 instructs the MAG 320 to provide various types of prefixes to the MN 310.

When processing this message 363, the MAG 320 sends out a router advertisement (RA) message 362 (RA (plural prefix option) in a stateless address configuration mode. Herein, the RA message 364 includes a plurality of different types of prefixes added thereto as an option. The various types of prefixes added to the RA message 364 may include an on-link prefix of the MAG 320, a prefix of an address of an egress interface of the MAG 320, and a local prefix of this PMIPv6 domain. The RA message 364 preferably further includes a description of each type of prefix (information indicating what type of prefix is), thus allowing the MN 310 to understand a type of each prefix easily. In the above-stated operation, in response to a request of a plurality of prefixes from the MN 310 with the message 361, the MAG 320 transmits the RA message 364 including a plurality of prefixes. However, a plurality of prefixes may be acquired by reading a plurality of prefixes understood (memorized) beforehand by the MN 310 based on a prior agreement between the network side and the MN 310 side, or the network side may actively make a notification of a plurality of available prefixes without receiving a request from the MN 310.

Assume herein that the MN 310 understands a current care-of address of a CN 360 as a correspondent node. Since the CN 360 connects with the home PMIPv6 domain of the MN 310, a prefix of the care-of address of the CN 360 will be similar to a prefix of the home address of the MN 310. For instance, when a model of sharing a prefix is used, the prefix of the home address of the MN 310 and the prefix of the care-of address of the CN 360 are the same. When a model giving a prefix specific to each MN is used, the home address of the MN 310 and the care-of address of the CN 360 are the same up to a certain common bit number. Comparison is made between the prefixes of these addresses, whereby the MN 310 can understand the possibility of a problem occurring for route optimization because the CN 360 currently exists in the same domain, and conducts RR signaling with the CN 360.

In any case, the MN 310 can use an on-link prefix of the MAG 320 to configure a care-of address for local breakout. When such a care-of address for local breakout is configured, the MN 310 uses a NA message 365 (NA (on-link care-of address)) of ICMP, for example, to request the MAG 320 to conduct MCoA registration (Multiple CoA BU: binding update of a plurality of care-of addresses) with the LMA 330. Herein, when the address for local breakout is conveyed with the NA message 365, the NA message 365 has a configuration enabling information on both of the home address and the care-of address (CMIP binding) to be embedded therein.

The MCoA registration in the present invention expands a conventional method of registering a plurality of care-of addresses for one home address, so as to register contents of PMIP binding by PBU together with contents of CMIP binding conducted by conventional BU. At this time, it is efficient to make a request to (collectively) register a care-of address for local breakout together with PBU of a MAG as described later.

By transmitting this NA message 365, the MN 310 instructs or requests the MAG 320 to conduct MCoA registration with the LMA 330. The MCoA registration by the LMA 330 makes the address of the egress interface of the MAG 320 to be transmitted and information on the home address prefix of the MN 310 and further the care-of address of the MN 310 to be transmitted. When a MCoA registration message 366 (MCoA BU (HoA of MN, CoA of MN) is transmitted to the LMA 330 and the LMA 330 receives this MCoA registration message 366, the LMA 330 generates both of CMIP binding and PMIP binding. The CMIP binding is binding between the home address of the MN 310 and an on-link care-of address (global care-of address) of the MN 310, and the PMIP binding is binding between the home address of the MN 310 and the address of the egress interface of the MAG 320.

When transmitting the NA message 365, the MN 310 starts RO processing with the CN 360. The MN 310 transmits a HoTI (Home Test Init) message 367 (HoTI to CN). Herein, a source address of this HoTI message 367 is the HoA of the MN 310. Therefore, this HoTI message 367 is tunneled to the LMA 330 as the home agent of the MN 310. This tunneled message is indicated with a HoTI message 368 (HoTI to CN). The LMA 330 operating as the home agent of the MN 310 decapsulates this HoTI message 368 and searches an address of the CN 360. This address of the CN 360 is found in the PMIP cache entry of the LMA 330, and the LMA 330 uses this address of the CN 360 to tunnel a HoTI message 369 (HoTI to CN) to the MAG 350 connecting with the CN 360. This HoTI message 369 is decapsulated by the MAG 350, and thereafter is transmitted as a HoTI message 370 (HoTI to CN) to the CN 360.

The MN 310 further transmits a CoTI (Care-of Test Init) message 371 to the CN 360. A source address of this CoTI message 371 is the care-of address of the MN 310, which is created from the on-link prefix. A destination address thereof is the care-of address of the CN 360 (the same as or similar to a prefix acquired from the LMA 330). Thus, this CoTI message 371 is not tunneled as in the case of PMIP, but is received (intercepted) by the LMA 330 as illustrated in FIG. 3. A destination address of this CoTI message 371 is the care-of address of the CN 360, and the LMA 330 having PMIP binding concerning this destination address receives (intercept) this CoTI message 371, and tunnels the same to the MAG 350 as illustrated with a CoTI message 372 (CoTI to CN). Then, finally, the MAG 350 completely decapsulates the CoTI message 372, and transmits an internal CoTI message 373 (CoTI to CN) to the CN 360. Herein, when a foreign PMIP domain intervenes between the MN and the CN, there may be a case of a tunnel configured with the foreign PMIP domain intervening, irrespective of a prefix and an on-line prefix of the LMA of the home domain.

After receiving the HoTI message 370 and the CoTI message 373, the CN 360 transmits a HoT message 374 (HoT to MN) and a CoT message 378 (CoT to MN) as illustrated in FIG. 3. Since those skilled in the art can easily understand routes of these messages, the detailed description of the HoT messages 374 to 377 and the CoT messages 378 to 380 will be omitted. Herein, it is important that the HoT message 374 is transmitted to a source address of the HoTI message 370, and the CoT message 378 is transmitted to a source address of the CoTI message 373. Further, the CN 360 uses, a source address of the HoT message 374 and the CoT message 378, a care-of address (originating from a prefix of a PMIP domain). When a RR test is completed, the MN 310 transmits a BU message 381 (BU to CN) to a CN, thus making it possible to register CMIP binding with the CN 360. The BU message 381 is tunneled from the LMA 330 to the MAG 350 (BU message 382), is decapsulated by the MAG 350, and is transferred to the CN 360 (BU message 383).

When the CN 360 notices that a prefix (prefix of PMIP domain) of the current care-of address of the CN 360 and the home address prefix of the MN 310 have some similarity or when some hint (information indicating that they exist in the same PMIP domain) is given from the LMA 330 and the MN 310, the CN 360 can conduct RR and BU with the MN 310 using the on-link care-of address. This is indicated with processing 384 (RR and BU from CN to MN) of FIG. 3. Assume herein that a plurality of prefixes can be notified with a RA message notified by the MAG 350 and the CN 360 can select an on-link prefix to configure a care-of address. When bidirectional RR is thusly finished, the MN 310 and the CN 360 conduct a data communication via an optimized route as indicated with a message 385 (bidirectional data flow between the MN and the CN) of FIG. 3. As for the CN 360 illustrated in FIG. 3 also, a HA function of the CN 360 may be installed in the same LMA 330.

The following describes an operation of the present invention when an AR does not implement a function of a MAG. The following describes a different from the above-stated case (the operation according to FIG. 3). As described in PLMN 1 of FIG. 1, this scenario can occur when a function of an ePDG exists in not in the AR but in a gateway (GW).

In this scenario also, assume that the MN 10 moves in a home PMIPv6 domain, the MN 10 connects with an AR 20 and acquires access authorization in a 3GPP AAA server 60, and an ePDG/MAG 40 acquires a prefix of the PMIPv6 domain. Thus, in order to realize an operation similar to that of FIG. 3, some interaction has to be conducted between the AR 20 and the ePDG/MAG 40.

The MN 10 may require a plurality of types of prefixes from the AR 20 as described above, and in this case the AR 20 passes this request information to the ePDG/MAG 40. The ePDG/MAG 40 conducts authorization, passes a prefix of the PMIPv6 domain related to the MN 10 to the AR 20, and further requests the AR 20 to make a notification of various types of prefixes. In this case, the ePDG/MAG 40 has to keep information as to from what AR NAI information is given and information as to what AR an address configured from a specific LMA prefix or a LMA prefix is provided.

After receiving the plurality of different types of prefixes, the MN 10 connecting with the AR 20 can configure an on-link care-of address and conduct RO with a CN existing in the same PMIPv6 domain. When the MN 10 wants to use a PMIPv6 domain prefix for a communication with a legacy CN connecting with any point on the Internet, the MN 10 uses a HoA of the MN 10 to transmit a packet. In this case, the packet has to be tunneled to the ePDG/MAG 40 from the MN via the AR 20, and the ePDG/MAG 40 has to decapsulate this packet and further tunnel the same to the LMA 50. Herein, tunneling is required from the AR 20 to the ePDG/MAG 40 or the ePDG/MAG 40 has to keep a state concerning with what AR 20 a specific MN 10 connects. However, a plurality of ePDG/MAGs 40 are disposed so as to have one-to-one correspondence between the ePDG/MAGs 40 and the ARs 20, whereby such a matter can be dealt with.

FIG. 3 describes the operation in the case where the MAG/AR conducts MCoA registration with the home agent (functioning as a LMA of the PMIPv6 domain also) of the MN. Such MCoA registration is typically effective for load balancing. Assuming that the CN 360 has a different home domain in FIG. 3, the CN 360 does not need to request the LMA 330 to make MCoA registration in order to cope with the above-stated problem of BU storm. However, when the LMA 330 wants to conduct load balancing for the CN 360, the CN 360 may request the MAG 350 to make MCoA registration with the LMA 330. The MAG 350 transmits the MCoA registration, whereby the PMIPv6 local domain address of the CN 360 is associated with the address of the MAG 350 and the on-link global address of the CN 360 is associated with the PMIPv6 local domain address of the CN 360. In this case, there is a need to establish mutual security association between the LMA 330 and the CN 360 existing in a foreign PMIPv6 domain, so as to set such binding.

Further, a prefix of the MAG 320 may be used to configure an address for local breakout to conduct a communication with the CN 360. When the MN 310 uses the address of the egress interface of the MAG 320 to configure a global address for local breakout, there is an advantage of eliminating the necessity for the MN 310 to execute DAD for the address.

When the MN 310 uses a prefix of the MAG 320 to configure a global address for local breakout, the MAG 320 needs to execute DAD according to the address of the MN 310. In this case, DAD signaling storm may occur in a sub-network connecting with the MAG 320, so that the MAG 320 has to execute neighbor discovery proxy signaling (ND proxy signaling) concerning these addresses. When all of the MNs connecting with the MAG 320 use the address for local breakout, the MAG 320 has to keep some information to send out a packet correctly to the MNs, and keep a status concerning a CN connecting with each MN. The MAG 320 further has to check a source address of a data packet before sending out the data packet. The MAG 320 has to have high throughput and a memory of large capacity so as to conduct such an operation.

Further, when all of the MNs connecting with the MAG 320 use the MAG address as the address for local breakout, the MN may have to pass a list of CNs to the MAG every time the MN moves (every time the MAG is changed). When a large number of MNs under the control of a MAG have a common CN such as in a large number of MNs conducting a communication with one CN, for example, it may be difficult for the MAG to specify a MN to which a data packet is to be sent out. In such a case, the MAG has to keep home address information on the MN and conduct processing of verifying ownership of this home address so as to send out the data packet correctly.

The following is a detailed description of a packet configuration of a MCoA registration message transmitted from the MAG 320 to the LMA 330 illustrated in FIG. 3. When the MN has a plurality of care-of addresses associated with one or a plurality of interfaces, the MN tries to register these care-of addressees with a home agent so as to conduct various setting such as local balancing, fault tolerance, reliability and priority setting.

For instance, a registration message of the plurality of care-of addresses may be transmitted by individually transmitting a registration message capable of registering binding of one care-of address for one home address plural times, or a registration of the plurality of care-of addresses (MCoA) may be collectively transmitted, whereby binding of one home address and the plurality of care-of addresses may be registered with one registration. Herein, the latter collective registration of a plurality of care-of addresses is called bulk registration.

The MCoA registration message (MCoA BU message) basically uses a BID option. This BID option is identification information to specify binding, whereby a HA can identify a plurality of bindings concerning a certain single home address, and can prevent registration transmitted from another interface from overwriting the binding. Further, the BID option enables identification of individual interfaces of the MN.

This BID option has a priority field. This priority field enables the MN to set a priority for the use in the HA so that a specific care-of address can be used among a plurality of care-of addresses. In the case of the bulk registration, since a plurality of BID options are inserted in one registration message, each BID option is provided with a care-of address field. On the other hand, in the case of the MCoA registration by individual registration, since the care-of address is transmitted with a source address of the registration message, there is no need for the BID option to always have a care-of address field.

Figure 4:
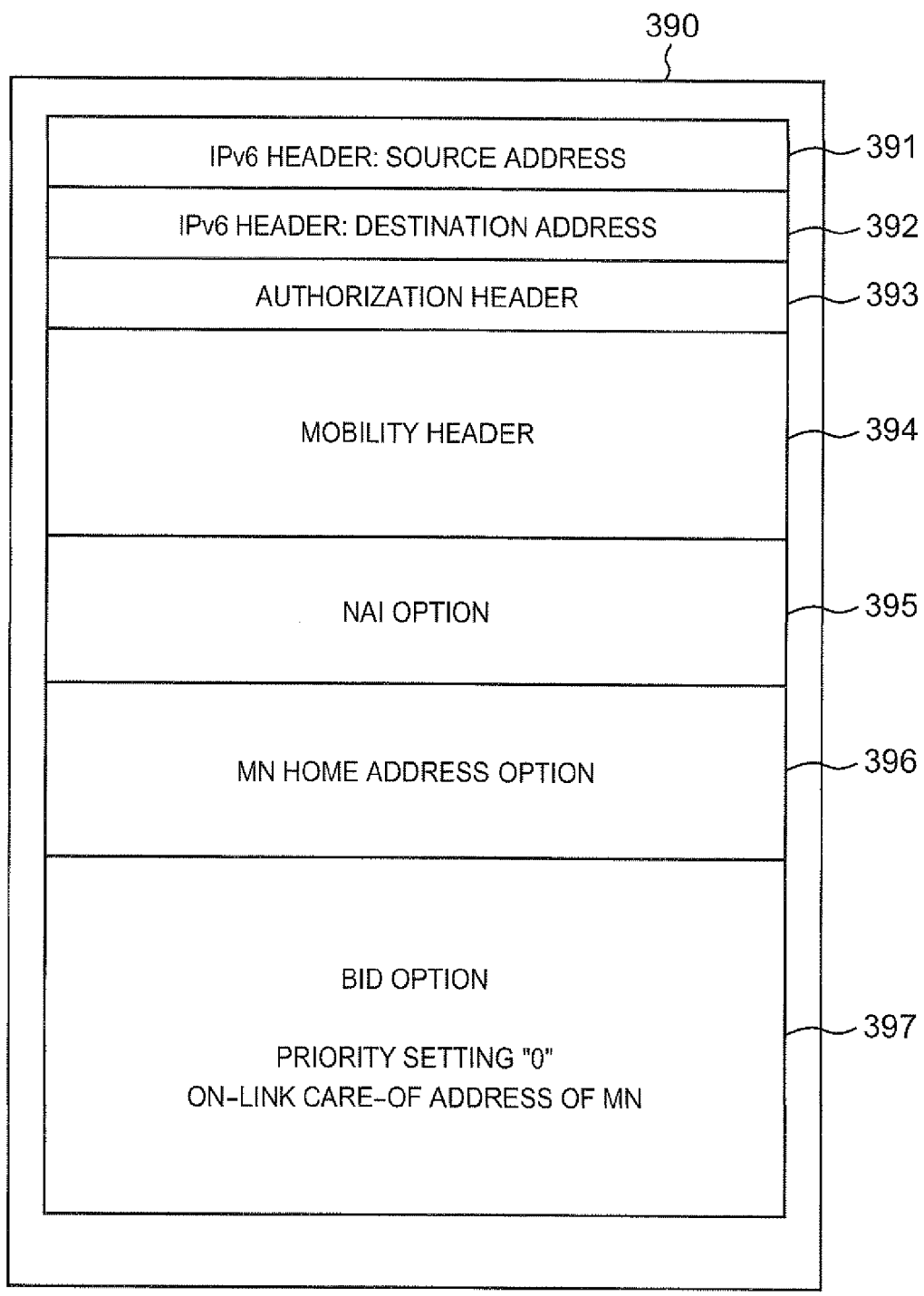
FIG. 4 illustrates an exemplary configuration of a MCoA registration message (MCoA BU message) in one embodiment of the present invention.

In the MCoA registration illustrated in FIG. 3, MCoA is registered with one registration, so that the bulk registration can be used appropriately. In this case, both of the PMIP binding and the CMIP binding are conducted as described above. FIG. 4 illustrates an exemplary packet configuration of a MCoA registration message to conduct both of the PMIP binding and the CMIP binding. This MCoA registration message is a PBU message as described in Non-Patent Document 2, which has to have a field set therein, so as to enable further insertion of CMIP binding, for example. When receiving this MCoA registration message, the HA refers to an additional option to convey a CMIP binding parameter and generates both of the PMIP binding and the CMIP binding.

FIG. 4 illustrates a MCoA registration message 390 of a bulk registration type. This MCoA registration message 390 has a source address field 391 including an address of an egress interface of a MAG and a destination address field 392 including an address of a LMA. An authorization header 393 includes authorization data generated from security association between the MAG and the LMA.

The MCoA registration message 390 further includes a mobility header 394. This mobility header 394 is to conduct binding update, which is of a new type related to PMIP as disclosed in Non-Patent Document 2.

There is a NAI option 395 in this mobility header 394. This NAI option 395 is to convey a NAI to generate PMIP type binding in the LMA. Herein, PMIP cache in the PMIP binding may not have a home address value of the MN and uses a NAI only, and therefore the NAI option 395 is an essential option in the PMIP binding.

There is a MN home prefix option 396 also in the mobility header 394. When an individual prefix is provided to each MN, this MN home prefix option 396 conveys a home prefix specific to the MN, and when a common prefix is provided, this MN home prefix option 396 conveys a MN home address or the common prefix.

There is a BID option 397 as the final option in the MCoA registration message 390. At this BID option 397, an on-link care-of address of a MN is inserted in a care-of address field. When the MAG does not want to set a high priority to binding (i.e., CMIP binding) of a care-of address to reduce load of decapsulation processing, priority setting of the BID option 397 may be set at "0", so as not to use binding or CMIP binding of this care-of address.

When the MN uses a MAG address as the on-link care-of address, a normal PBU message without a BID option inserted therein may be transmitted from a MAG to a LMA. However, it is desirable for this PBU message to have a flag showing to a HA/LMA that both types of binding including PMIP binding and CMIP binding have to be created for the MN. In order to achieve this, the MAG may set a home flag as an option, or the LMA receiving this PBU (even when a flag is not set) may estimate that the MN is in a state connecting with a home at the same time. When receiving this MCoA registration, the LMA conducts processing while regarding the MA as in a state connecting with the home at the same time. In this processing for MCoA registration, registration of the PMIP binding and registration of CMIP binding of MCoA associating CoA with HoA in the case of a connection with the home at the same time are conducted.

The following describes an operation by the LMA. When a data packet is transmitted to an address of a MN (configured with a LMA prefix), the LMA receives (intercepts) this packet and checks binding cache. Herein, when a plurality of bindings such as PMIP binding and CMIP binding exist in association with a local address of the PMIPv6 domain of the MN, the LMA typically tunnels a packet using the PMIP binding. This is because the priority of the CMIP binding is typically set low as described above. In the tunneling using the PMIP binding, the LMA typically tunnels a data packet to a MAG address connecting with the MN. However, in order to reduce load of decapsulation processing, the MAG may tunnel a packet, which is to be delivered to an address of a prefix of the PMIPv6 domain of the MN, to the on-link address of the MN from the LMA.

When the MAG requires such an operation, the MAG can set high registration priority to the CMIP binding of the MCoA, thus requiring the LMA to conduct such an operation. Such BU can be implemented by the MAG to set a value of priority of a BID option concerning the CMIP binding at "255", for example. When such CMIP binding of high priority exists, the LMA uses the CMIP binding to transfer a data packet directly to the MN. Tunneling is conducted using the CMIP binding, whereby the packet will be tunneled to the on-link care-of address of the MN.

Figure 5:
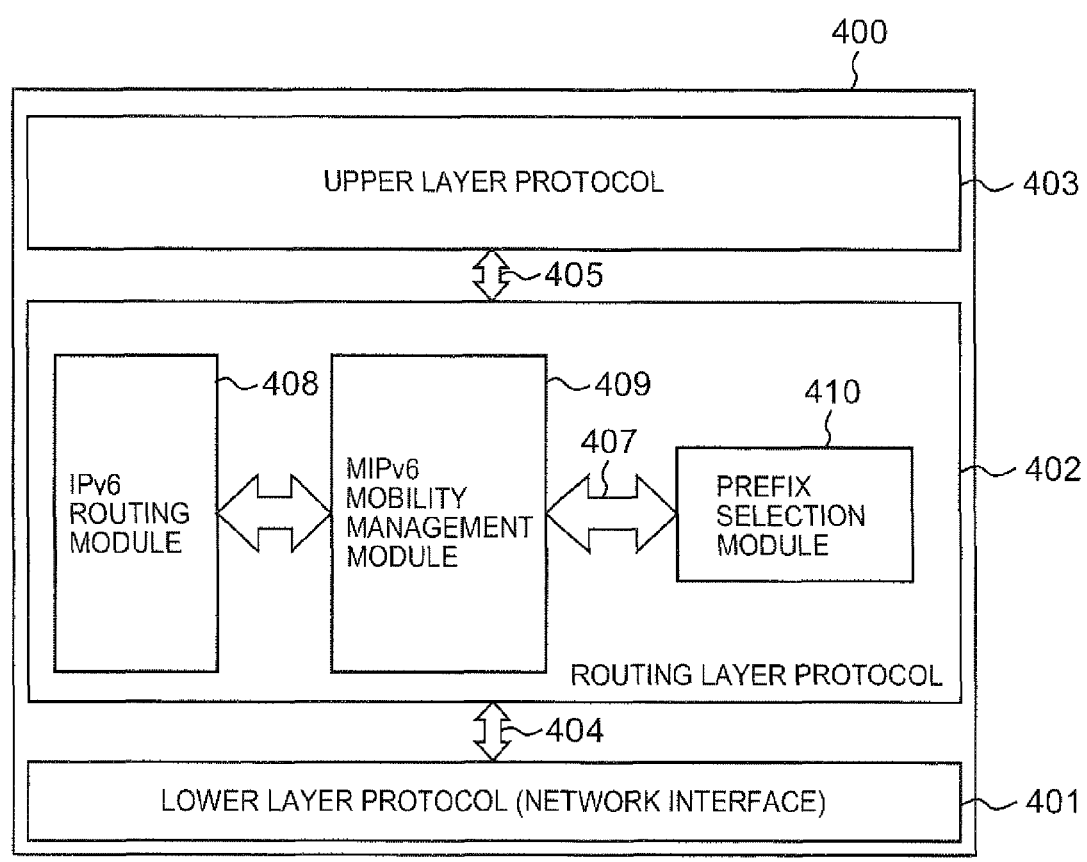
FIG. 5 illustrates an exemplary preferable configuration of a mobile node in one embodiment of the present invention.

The following describes the configuration of a MN in one embodiment of the present invention. The MN has a multihoming function, and can conduct processing of a plurality of prefixes to configure a plurality of care-of addresses to associate them with one interface. FIG. 5 illustrates an exemplary configuration of a MN in one embodiment of the present invention. In order to embody the present invention, a MN 400 has all software, hardware and firmware required to implement protocol stack related to IPv6. The MN 400 illustrated in FIG. 5 has a multihoming function.

Lower layer protocol (network interface) 401 has all physical layers and link layer protocols. Routing layer protocol 402 of the MN 400 has all protocols related to routing. Upper layer protocol 403 has all transport layer protocols and application layer protocols.

The routing layer protocol 402 and the upper layer protocol 403 exchange a message via an interface 405. The lower layer protocol 401 and the routing layer protocol 402 exchange a message via an interface 404. The routing layer protocol 402 has an IPv6 routing module 408, a MIPv6 mobility management module 409, and a prefix selection module 410.

The prefix selection module 410 determines a plurality of prefixes required by the MN, and further decides what prefix is to be used for a communication with what type of CN. Herein, this prefix selection module 410 interacts with the MIPv6 mobility management module 409. When configuring a plurality of care-of addresses, the MIPv6 mobility management module 409 requests a neighbor discovery function to transmit a neighbor advertisement ICMP message including an on-link care-of address configured by the MN to an AR. The prefix selection module 410 interacts with the MIPv6 mobility management module 409 via an interface 407, and the IPv6 routing module 408 interacts with the MIPv6 mobility management module 409 via an interface 406. Prefix information is transmitted via the interface 407, so that the MIPv6 mobility management module 409 can configure a care-of address related to the provided prefix.

Figure 6:
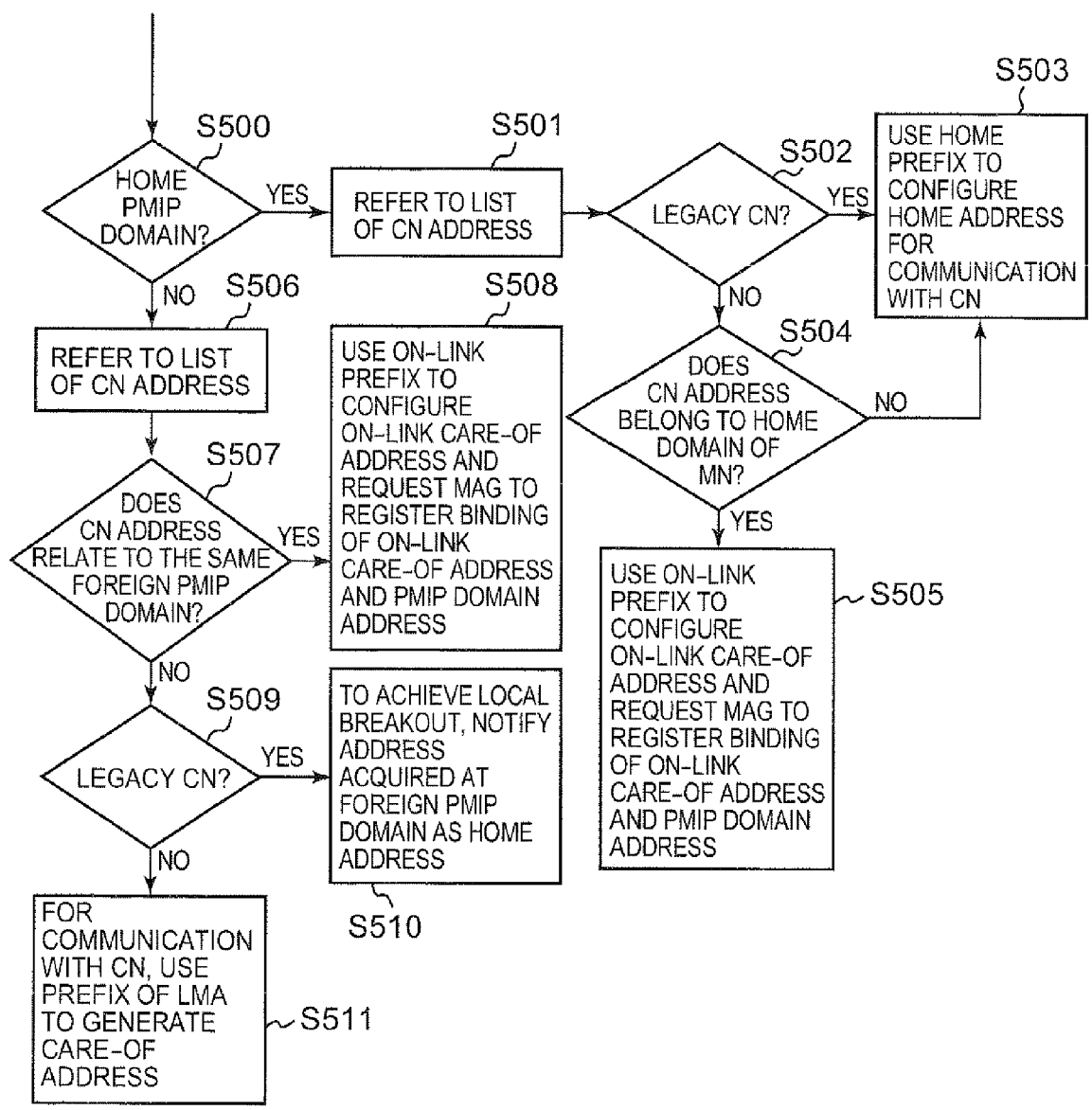
FIG. 6 is a flowchart illustrating one exemplary preferable operation of a mobile node in one embodiment of the present invention.

Referring now to a flowchart illustrated in FIG. 6, the following describes an exemplary operation in the above-stated prefix selection module 410. Assume herein that a MN moves in a local mobility management segment introducing PMIPv6 protocol.

In FIG. 6, when the MN moves in some domain, at Step S501 firstly the MN checks whether the domain is a home domain (home PMIPv6 domain) or not. If the MN moves in the home domain, Step S501 is executed.

The MN has a CN list, and at Step S501 the MN selects one CN from the list and determines what type of address is to be configured to conduct a communication with the CN. Assume herein that the MN classifies CN types and at Step S502 the CN can determine whether the CN is a legacy type or not (determine whether the CN is either a legacy CN or a RO enabled CN).

At Step S502, if it is determined the CN as a legacy type, Step S503 is executed. Since the MN exists in the home domain, an address configured using a home prefix is used for a communication with the legacy CN, thus substantially optimizing a routing path. That is, at Step S503, the MN uses the home prefix to configure a home address for a communication with the CN (legacy CN).

On the other hand, if it is not determined the CN as a legacy type at Step S502, at Step S504 the MN confirms whether a current address (care-of address) notified to the MN belongs to the home domain of the MN or not.

If Step S504 is executed and it is confirmed that the current address (care-of address) of the CN notified to the MN does not belong to the home domain of the MN, at Step S503 the MN uses the home prefix of the MN to configure a home address for a communication with a CN (RO-enabled CN). That is, if the CN is RO-enabled but exists in another domain (foreign domain), a communication using a home address typically implements RO with this CN. Note here that the LMA may not exist in a default route path, and in this case RO in a complete state may not be realized as described below. In this case, since the CN is RO-enabled, the MN may decide so as to conduct a RO communication using an on-link care-of address in a communication with the CN.

On the other hand, if it is confirmed at Step S504 that the current address (care-of address) of the CN notified to the MN belongs to the home domain of the MN, the MN executes Step S505. That is, if the CN understands that the CN exists in the same home domain, at Step S505 the prefix selection module 410 of the MN decides to use an on-link care-of address to conduct a RO communication with this RO-enabled CN and generates the on-link care-of address using the on-link prefix, and requests the MIPv6 module 409 to transmit an appropriate NA message (including on-link care-of address) to the AR. Herein, the NA message in this case includes the home address and the on-link care-of address. Thereby, the MN requests the MAG to transmit a BU message of the MCoA.

At Step S500, if the domain in which the MN moves is not a home domain, the MN exists in a foreign domain. In this case, at Step S506 the MN refers to a CN address list to select one CN from the CN address list. Then, at Step S507 the MN determines whether the CN address relates to the same foreign domain as the foreign domain where the MN exists.

At Step S507, if it is determined that the CN address relates to the same foreign domain as the foreign domain where the MN exists, at Step S508 the prefix selection module 410 of the MN decides to use an on-link care-of address, generates the on-link care-of address using the on-link prefix, and requests the MIPv6 module 409 to transmit an appropriate NA message (including on-link care-of address) to the AR.

On the other hand, if it is determined at Step S507 that the CN address does not relate to the same foreign domain as the foreign domain where the MN exists (i.e., the MN and the CN are located in different domains), at Step S509 determination is made as to whether the CN is a legacy type or not.

If it is determined that the CN is of a legacy type at Step S509, Step S510 is executed. If the MN exists in a foreign domain, local breakout implemented in a communication between the MN and the legacy CN can make a communication route efficient. To implement this, for example, the MN may use an address acquired in a foreign PMIPv6 domain as a home address used for a communication with the legacy CN. That is, at Step S510 the MN uses a prefix of the foreign PMIP domain to configure an address, and requires the MIPv6 module 409 to transmit an appropriate NA message while setting this address as a home address.

On the other hand, if it is determined that the CN is not of a legacy type at Step S509, Step S511 is executed. If the CN exists in another PMIPv6 domain, the MN may use a care-of address acquired using a foreign PMIPv6 prefix to execute RO with this CN. That is, in this case determination is made whether a PMIPv6 domain prefix is to be used or not to configure the address and further whether RO is to be conducted or not. For instance, at Step S511 the MN uses a prefix of the address of the LMA to generate a care-of address so as to conduct a communication with the CN.

The following describes a transmission route of a data packet in a communication between a MN and a CN when a prefix for local breakout is used or when an on-link global prefix of a MN is used for RO.

Figure 7:
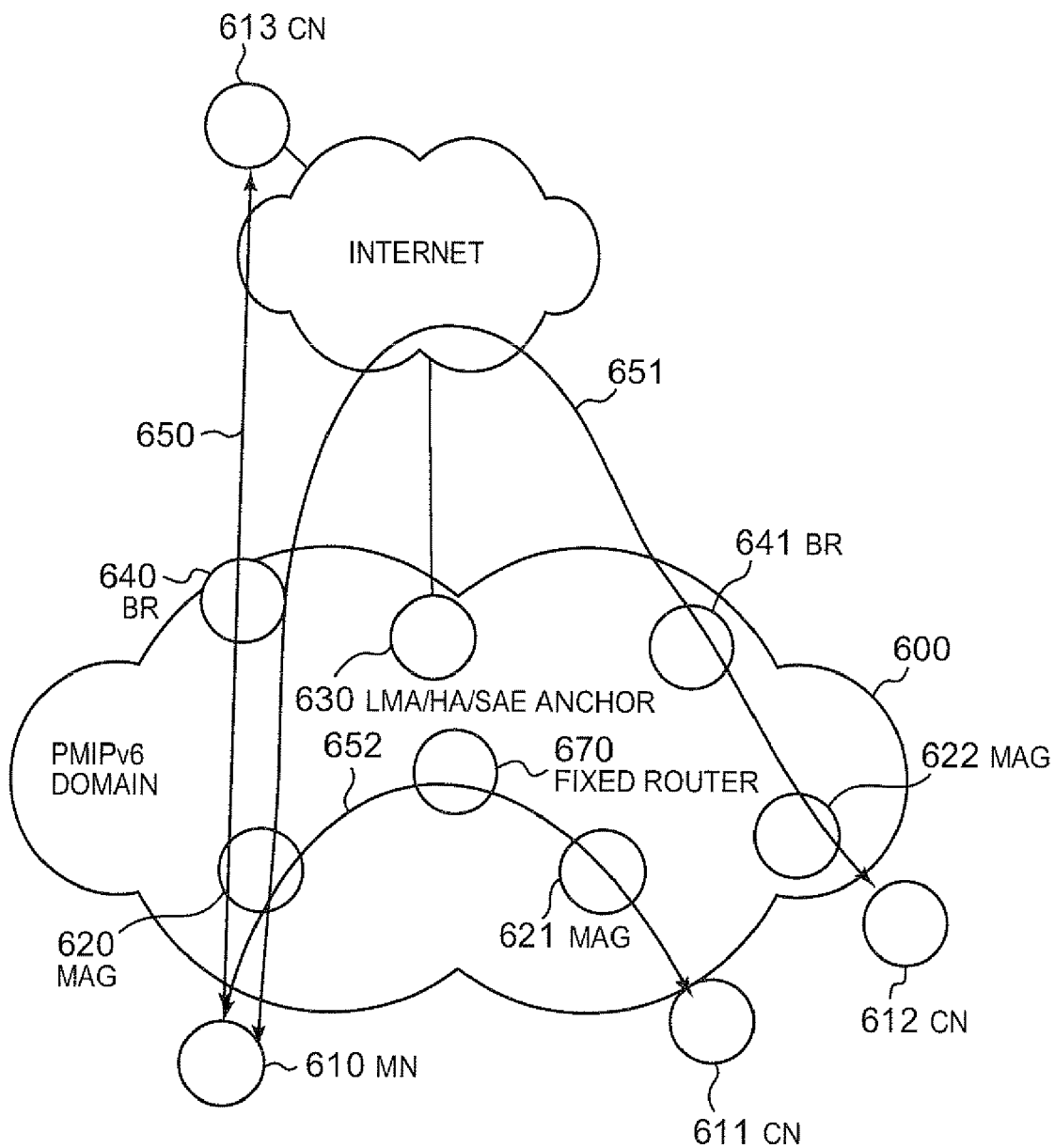
FIG. 7 schematically illustrates an exemplary data packet transmission route between a MN and a CN when a global address configured with a global prefix is used for route optimization in one embodiment of the present invention.

In FIG. 7, a MN 610 connects with a PMIPv6 domain 600 as a home domain. The MN 610 configures an on-link care-of address from an on-link prefix (notified from a MAG 620 for route optimization). Herein, the MN 610 basically configures both of a home address and the on-link care-of address.

In FIG. 7, the MN 610 conducts communications with CNs 611, 612, and 613. Assume that all of these CNs 611, 612, and 613 are RO-enabled CNs and a RO path is established between the MN 610 and each of the CNs 611, 612 and 613 using RR mechanism. Assume further that the MN 610 connects with the MAG 620, the CN 612 connects with a MAG 621, and the CN 612 connects with a MAG 622. That is, both of the CN 611 and the CN 612 connect with the same PMIPv6 domain 600.

A LMA/HA/SAE anchor 630 assigns a PMIPv6 domain prefix to every MN in the PMIPv6 domain 600. The MAG 620 and the MAG 621 connect via a fixed router 670. Assume further that the LMA/HA/SAE anchor 630 is not located on a default routing path between the MAG 620 and the MAG 622. Thus, a communication route from the MN 610 to the CN 611 is a path 652 from the MAG 620 via a fixed router 670 and the MAG 621. A data communication route from the MN 610 to the CN 612 is a path 651 via a BR (Border Router) 640 and a BR 641. A data communication route from the MN 610 to the CN 613 is a path 650 from the MN 620 via the BR 640.

Assume herein that the CN connecting with the PMIPv6 domain 600 does not join to a PMIPv6 domain. In this case, the CN does not receive a PMIP service and acquires an on-link care-of address. However, in spite of not receiving a PMIP service, data communication routes between the MN 610 and the CN 611 and the CN 612 are a path 651 and a path 652 corresponding to the MAG 621 and the MAG 622 connecting with the CN 611 and the CN 612, respectively.

in the 3GPP PMIPv6 domain, an operator may own a non-trusted access network such as WLAN, whereas another operator may own a 3GPP core network (assuming that LMA exists in a core network). When the MN executes local breakout with a CN on the same access network, data will go through the path 651. That is, traffic does not need to go through a core network, but goes through the Internet. Only when a prefix in the PMIPv6 domain is used, traffic needs to go through a core network where a LMA exists.

There may be a case where, in a PMIPv6 domain, a MN wants to implement route optimization with a CN without tunneling after movement. In such a case, the MN cooperates with a MAG/AR and requests an on-link prefix only from the MAG/AR. Further, the MN notifies the MAG/AR that the MN does not want a PMIPv6 service. Assume herein that the MN is qualified to receive a PMIPv6 service provided in this domain. In such a case, the MN uses the on-link prefix to configure a care-of address and conducts RO with a CN. When the MN does not want a PMIPv6 service, a care-of address of the MN is only a care-of address configured from the on-link prefix, and the MN has to conduct updating for the home agent every time a sub-network is changed.

Figure 11A:
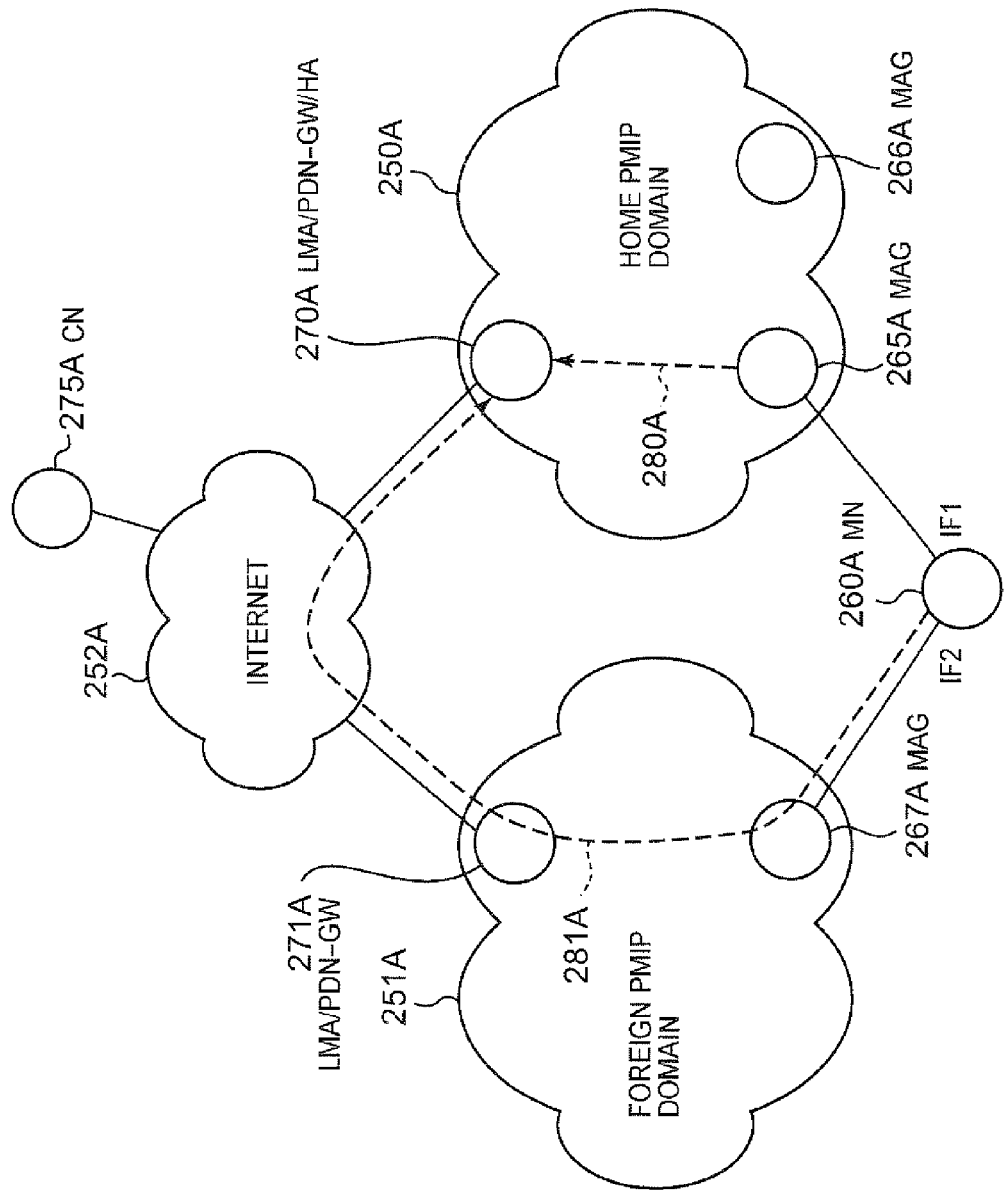
FIG. 11A illustrates a second exemplary network configuration to describe a problem in the conventional technique.

The following further describes, as an embodiment different from the above-stated embodiment embodying the present invention, a method of coping with a problem (e.g., a problem related to competition between PBU and BU) related to registration of a plurality bindings (multi-registration) as described in the conventional technique (FIG. 11A) and a problem related to a long path through which binding update goes through.

According to a method of one embodiment described herein, instead of transmitting binding update related to an interface connecting with a foreign domain via the interface, contents of BU registration of CMIP related to the interface connecting with the foreign domain is passed to a MAG connecting with a home domain (via the interface connecting with the home). At this time, the MAG is configured to transmit bulk registration including combination of PMIP and CMIP notifying of a reachability state of a plurality of interfaces of the MN. This method is executed, whereby a plurality of times of location update signaling is avoided, so that more quick BU registration of CMIP can be achieved via an interface connecting with the home domain.

Figure 8A:
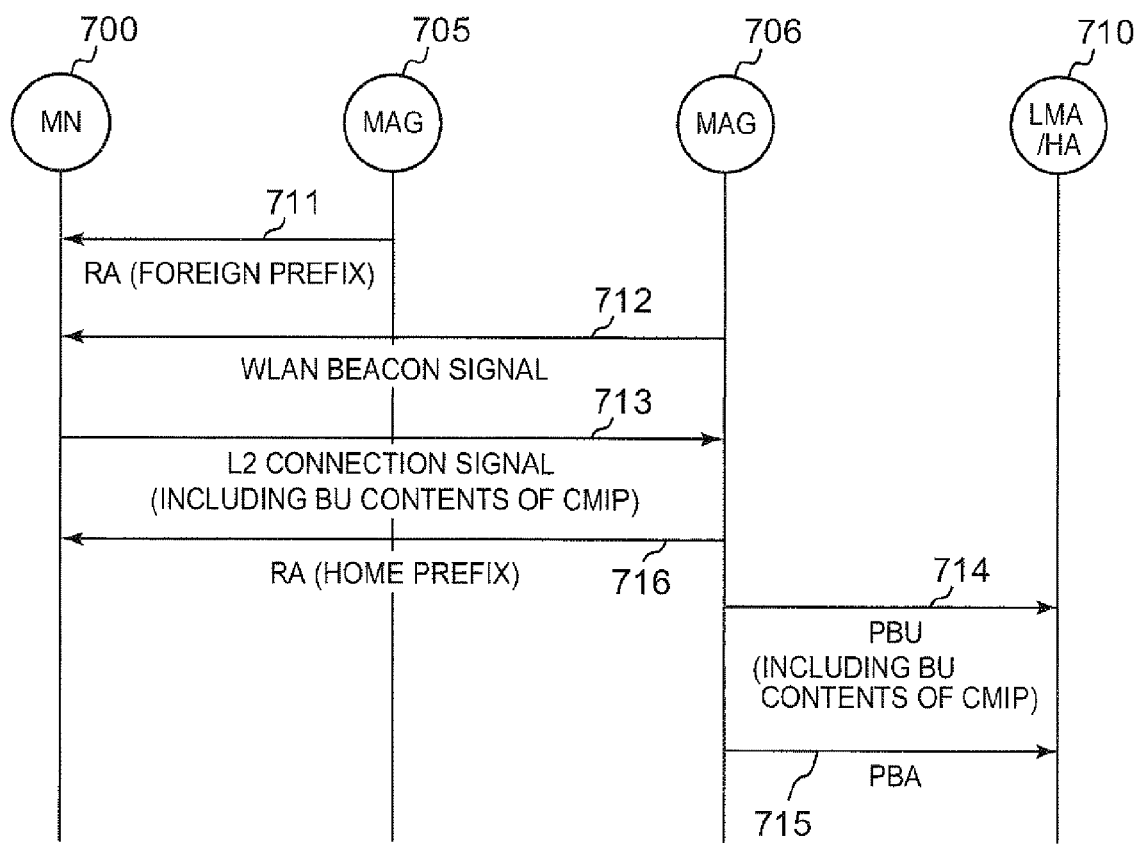
FIG. 8A is a sequence chart illustrating an exemplary operation when binding relating to a MN with a plurality of interfaces is updated using bulk registration in one embodiment of the present invention.

Referring to FIG. 8A, the following describes a method of this embodiment. In FIG. 8A, a MN 700 has two interfaces. An interface 1 (IF1) of the MN 700 connects with a foreign domain via a MAG 705. To connect with the MAG 705, the MN 700 receives a RA 711 from the MAG 705, and then configures a care-of address concerning IF1 from a foreign prefix included in the RA 711. The MN 700 further connects with a MAG 706 of a WLAN access network as a home PMIP domain via an interface 2 (IF2). Herein, in FIG. 8A the MN 700 connects with the home PMIP domain by access technique according to WLAN. However, the MN 700 can connect therewith by any access technique.

In IF2, the MN 700 firstly receives a beacon signal (WLAN beacon signal) from the MAG 706 of a WLAN access network. When L2 connection is conducted with a message (L2 connection signal) 713, the MN 700 can pass, to the MAG 706, the contents of BU of CMIP related to IF1 together with this message 713. Herein, the MN 700 may insert the BU contents of CMIP related to IF1 in the message 713, or may insert the BU contents of CMIP related to IF1 in another different message for transmission. Further, the MN 700 understands information that the IF2 may connect with the home PMIP domain, and then may pass the BU contents of CMIP related to IF1 to the MAG 706. Herein, the MN 700 may keep the latest roaming profile information related to IF2 and determine whether IF2 connects with the home PMIP domain or not based on the kept information, or may simply estimate that IF2 connects with the home PMIP domain.

Further, determination may be made whether IF2 connects with the home PMIP domain or not by referring to information that can be acquired from a domain connecting with IF2. If it is determined that any interface of the MN 700 including IF2 does not connect with the home PMIP domain, normal BU concerning CMIP may be transmitted.

As BU contents concerning CMIP that the MN 700 provides to the MAG 706 with the message 713, any information of a care-of address of IF1, a home address of IF1, authorization data, and a BU sequence number concerning CMIP or a plurality of pieces of information among them can be inserted. The authorization data is obtained by encrypting coupled information of a HoA of IF1 of the MN 700 and a care-of address of IF1 of the MN 700 using a security key of the MN 700. The security key of the MN 700 is generated by a HA (LMA/HA) 710 using any Internet key exchange protocol. The MN 700 may have to pass an identifier of IF1 to the MAG 706 with the message 713. If IF1 uses a home prefix different from a home prefix of IF2 to configure the home address, the identifier of IF1 does not need to be capable of distinguishing binding in the LMA/HA 710.

When the MAG 706 acquires the home prefix of the MN 700 from an AAA server (not illustrated in FIG. 8A), the MAG 706 sends out a RA 716 including this home prefix and transmits bulk registration information including combination of BU of CMIP and PMIP related to both of the interfaces. A message (PBU) 714 indicates a message including combination of BU contents concerning CMIP (BU contents concerning IF1) with PBU of PMIP (PBU concerning IF2), and a message (PBA) 715 indicates a response message thereof. Herein, the message 714 is desirably normal PBU used in a normal PMIPv6 operation except for having a new option to transmit the BU contents concerning CMIP and an interface identifier of IF1.

Further, instead of transmitting the BU contents concerning CMIP together with the message 713, after receiving the RA 716 from the MAG 706, the MN 700 may transmit a new L2 message or a L3 message for notification of the BU contents concerning CMIP. When the MN 700 is not sure about the IF2 connecting with the home PMIP domain, the MN 700 stands by for reception of the RA 716 from the MAG 706, and after it is confirmed that IF2 connects with the home PMIP domain by the reception of the RA 716, the MN 700 may transmit the BU contents concerning CMIP. As for signaling when the BU contents concerning CMIP is transmitted after receiving the RA 716, FIG. 8A does not illustrate anything. When the MN 700 transmits the BU contents concerning CMIP after receiving the RA 716, the MAG 706 has to acquire the BU contents concerning CMIP from the MN 700 after transmitting the RA 716, and then transmit the PBU 714. Thus, in this case, some degree of delay will occur for transmission of the PBU 714 basically.

When IF1 has to refresh binding, or when new binding for IF1 has to be created to obtain a new address configuration due to a reason such as handoff of IF1, assuming that IF2 still connects with the MAG 706, IF2 passes related information (information required to refresh binding) to the MAG 706. In this case, the MAG 706 can use refresh PBU to transmit the BU contents concerning CMIP to the LMA/HA 710. Herein, setting is such that when refresh of binding by the MAG 706 is conducted later (i.e., not conducted soon), the MN 700 may transmit a message designating to prevent delay of BU signaling concerning CMIP, for example, thus urging the MAG 706 to transmit the BU contents concerning CMIP quickly. The above-stated method in the embodiment can achieve bulk registration instead of registration of a plurality of bindings (multi-registration. Further, a plurality of location update bindings for the MN 700 is registered using a path (shorter routing path) via the home domain.

Figure 8B:
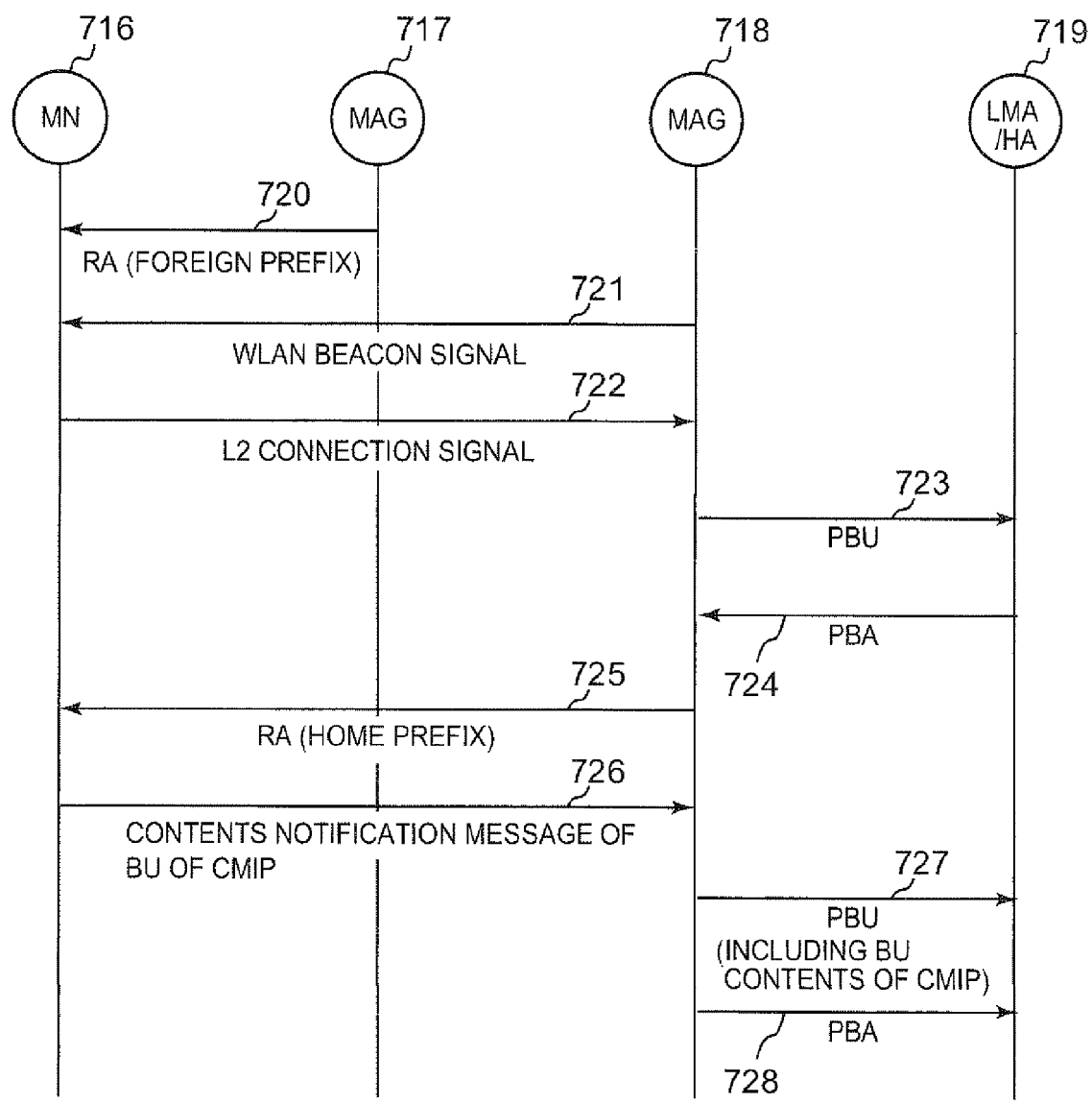
FIG. 8B is a sequence chart illustrating another exemplary operation when binding relating to a MN with a plurality of interfaces is updated using bulk registration in one embodiment of the present invention.

In the case where the prefix of the MN connecting with the home PMIP domain is provided from the LMA, signaling is somewhat different from the above-stated operation. Referring now to FIG. 8B, the following describes such signaling.

In FIG. 8B also, a MN 716 has two interfaces, connecting with a foreign domain via a MAG 717 in IF1 while connecting with a home PMIP domain via a MAG 718 in IF2. Assume herein that IF2 of the MN 716 just moves to the home PMIP domain.

The MN 716 receives a RA 720 from the MAG 717 at IF1, and configures a CoA from a foreign prefix included in the RA 711. Meanwhile, the MN 716 receives a beacon signal (WLAN beacon signal) from the MAG 718 at IF2. Then, after receiving the WLAN beacon signal 721, the MN 716 conducts a L2 connection with the MAG 718 with a message (L2 connection signal) 722. After the L2 connection with the MN 716, the MAG 718 conducts PBU 723 to acquire a home prefix concerning IF2 of the MN 716, and after that an AAA server (not illustrated) makes a verification of AAA to confirm authenticity of the MN 716.

Only after receiving a PBA 724 including a home prefix from a LMA/HA 719, the MAG 718 can transmit a RA 725. After receiving the RA 725 from the MAG 718, the MN 716 transmits a message 726 including BU contents concerning CMIP. Herein, the message 726 may be a L2 message or a L3 message.

In this scenario (scenario the LMA/HA 719 providing a prefix), the MAG 718 receiving the message 726 including BU contents concerning CMIP from the MN 716, has to transmit a second message to register BU binding concerning CMIP. FIG. 8B illustrates this second message (PBU 727) and a PBA 728 as a response thereto.

Further, in this scenario, a plurality of PBU/PBA (a pair of a PBU 723 and PBA 724 and a pair of a PBU 727 and a PBA 728) has to be transmitted at the time of the first connection. However, it is also possible not to transmit PBU doubly by using context transfer at a later home PMIP domain connection. For instance, when the MN 716 moves so that IF2 connects with another MAG (new MAG) in the home PMIP domain and there is a need to resend CMIP binding of IF1 thereto, a new MAG (MAG with which IF2 newly connects) in the home PMIP domain can use mechanism of context transfer to acquire information on a home prefix of IF2. In this case, a new PBU only like the PBU 272 has to be transmitted, and there is no need to transmit the PBU 723 and the PBU 724 even in later connections.

For instance, except for the above-stated possibility of transmitting PBU/PBA signaling doubly, it may be quicker to transmit the contents of BU of CMIP via a home domain. When the MN has two or more interfaces, BU contents concerning CMIP of one or a plurality of interfaces can be transmitted with the PBU 714 and the PBU 727.

According to the method of the above-stated embodiment, BU concerning CMIP about an interface connecting with a foreign domain is transmitted via a path of a PMIP domain (home domain), thus achieving quick CMIP BU. However, when an information server located in a home PMIP domain notifies that the home PMIP domain is in a congestion state, it may be better to transmit BU of CMIP via a normal path (i.e., via IF1).

A path for BU of CMIP is basically selected by a MN based on information from some trusted network entity. For instance, in FIG. 8A and FIG. 8B, when a home PMIP domain is congested, a MAG (MAG 706 or MAG 718) connecting with IF2 may request the MN 716 to transmit BU bulk registration of PMIP and CMIP via IF1.

In this case, in order to allow the MN to conduct BU bulk registration of PMIP and CMIP via IF1, the MAG has to provide BU contents of PMIP with a time stamp option added thereto.

IF2 of the MN may connect directly with a home link. In such a case, the MN can transmit a neighbor advertisement ICMP message, for example, to the LMA/HA, thus providing BU contents concerning CMIP at IF1 to the LMA/HA.

Figure 11B:
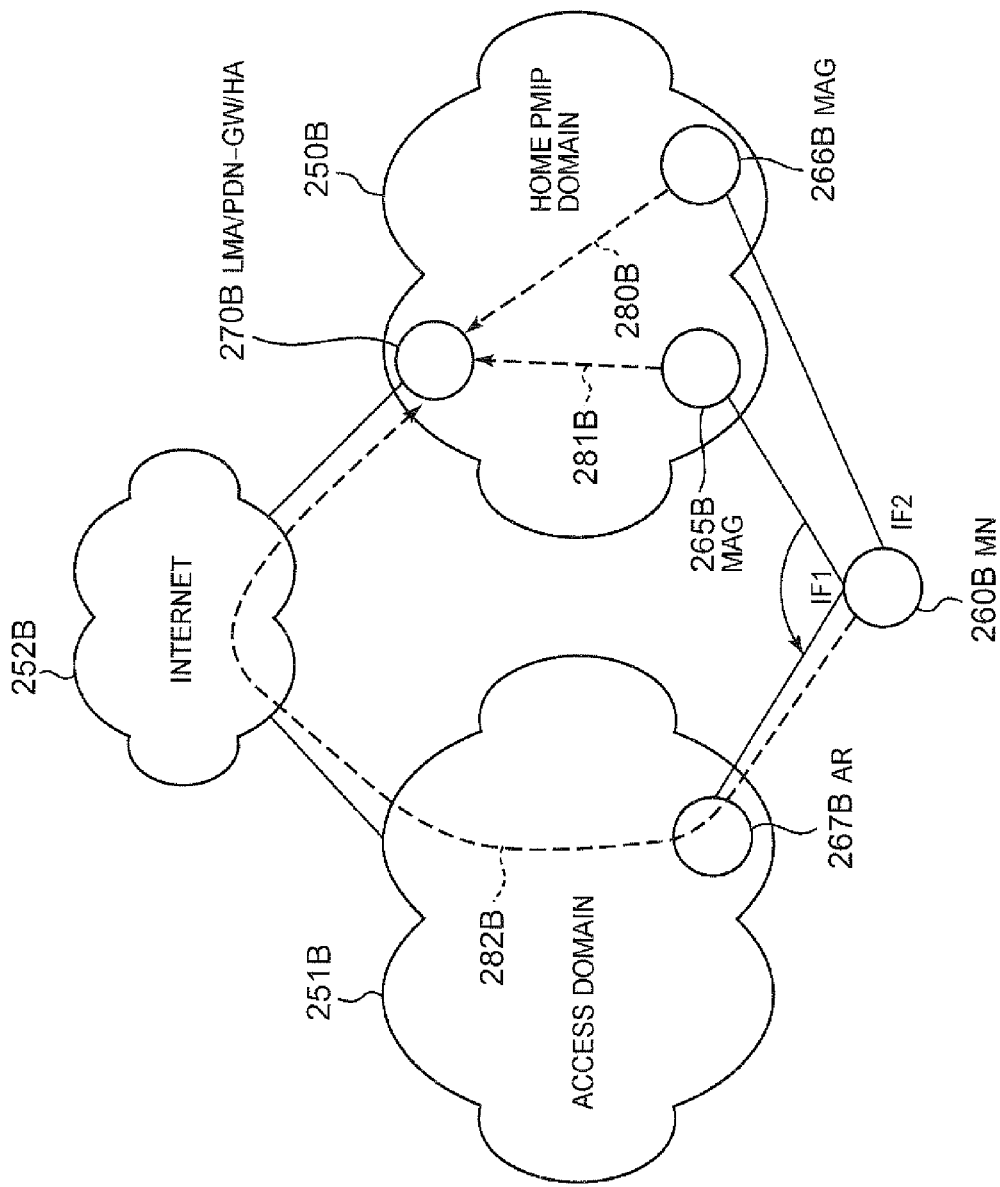
FIG. 11B illustrates a third exemplary network configuration to describe a problem in the conventional technique.

The following describes a method of coping with a handoff problem and a packet loss problem in the conventional technique illustrated in FIG. 11B. As described above referring to FIG. 11B, a major reason causing packet loss at IF1 (interface moving from a home PMIP domain to a foreign domain) is in that PBU of PMIP transmitted in the state where IF1 connected before movement reaches a HA (LMA/PDN-GW/HA 270) later than BU of CMIP transmitted when IF1 makes a connection after moving.

The following describes a method of coping with such a problem, where a BU message of CMIP of IF1 is provided with a time stamp option similar to a PBU message (PBU before movement of IF1) of PMIP related to IF1.

In this method, a BU message of CMIP related to IF1 is transmitted via an interface (i.e., IF2) connecting with a home PMIP domain and not moving. Thereby, a MAG connecting with the not-moving interface can add a time stamp option to a BU message of CMIP. The addition of a time stamp option allows the LMA/HA to easily identify the newest binding state concerning IF1 based on a time stamp value. Herein, the MAG may add a time stamp option to a message transmitted to the LMA/HA always or after determining the necessity thereof, and the MN may explicitly request the MAG to add a time stamp option.

Figure 9A:
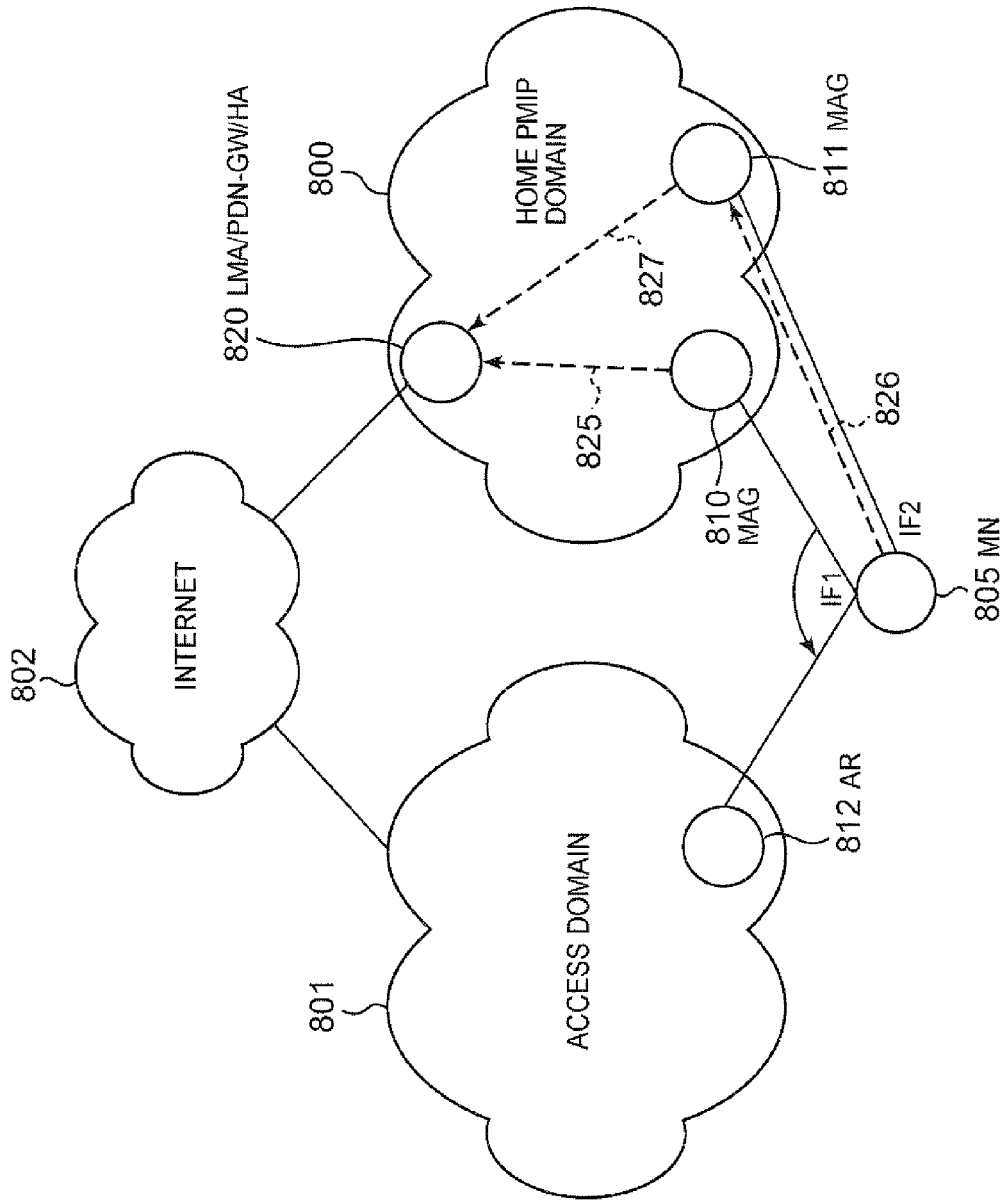
FIG. 9A illustrates another exemplary network configuration to describe an embodiment of the present invention.

Further, in this method, a BU message of CMIP may be coupled with a PBU message of PMIP related to a not-moving interface, and this coupling realizes further optimization of signaling. Referring now to FIG. 9A, the following describes this method.

In FIG. 9A, a MN 805 has two interfaces. IF2 connects with a home PMIP domain 800 via wireless link, and connects directly with a MAG 811. Meanwhile, assume that IF1 of the MN 805 connects with a MAG 810 of a home PMIP domain 800 via a wireless link and after that moves to a foreign domain 801. Assume that IF1 connects with the MAG 810 for a short time. Assume further that an AR 812 connects with the foreign domain 801, and IF1 of the MN 805 moves to connect with the AR 812. Assume still further that the home PMIP domain 800 and the foreign domain 801 connect with the Internet 802.

In this way, when IF1 makes a quick movement (connection with the MAG 810 for a short time), the MN 805 may expect the possibility that a message (PBU) 825 related to a connection before the movement of IF1 reaches later than BU of CMIP after the movement of IF1. In such a case, in order to prevent an error in the order of registration messages, the MN 805 can request the MAG 811 to transmit a BU message of CMIP related to IF1 with a message 826, and when the MAG 811 transmits this message, further can request the MAG 811 to insert a time stamp option. As long as this message (request message) 826 includes BU contents of CMIP related to IF1, it may be a L2 message or a L3 message.

When receiving the request message 826, the MAG 811 transmits a message (registration message) 827 to a LMA/HA 820. This message 827 includes an option to carry BU contents concerning CMIP provided from the MN 805 and a time stamp option inserted by the MAG 811 added to a normal PMIP PBU message. Herein, the inserted time stamp option includes time information obtained from a clock operating in the MAG 811.

Figures 9B, 10:
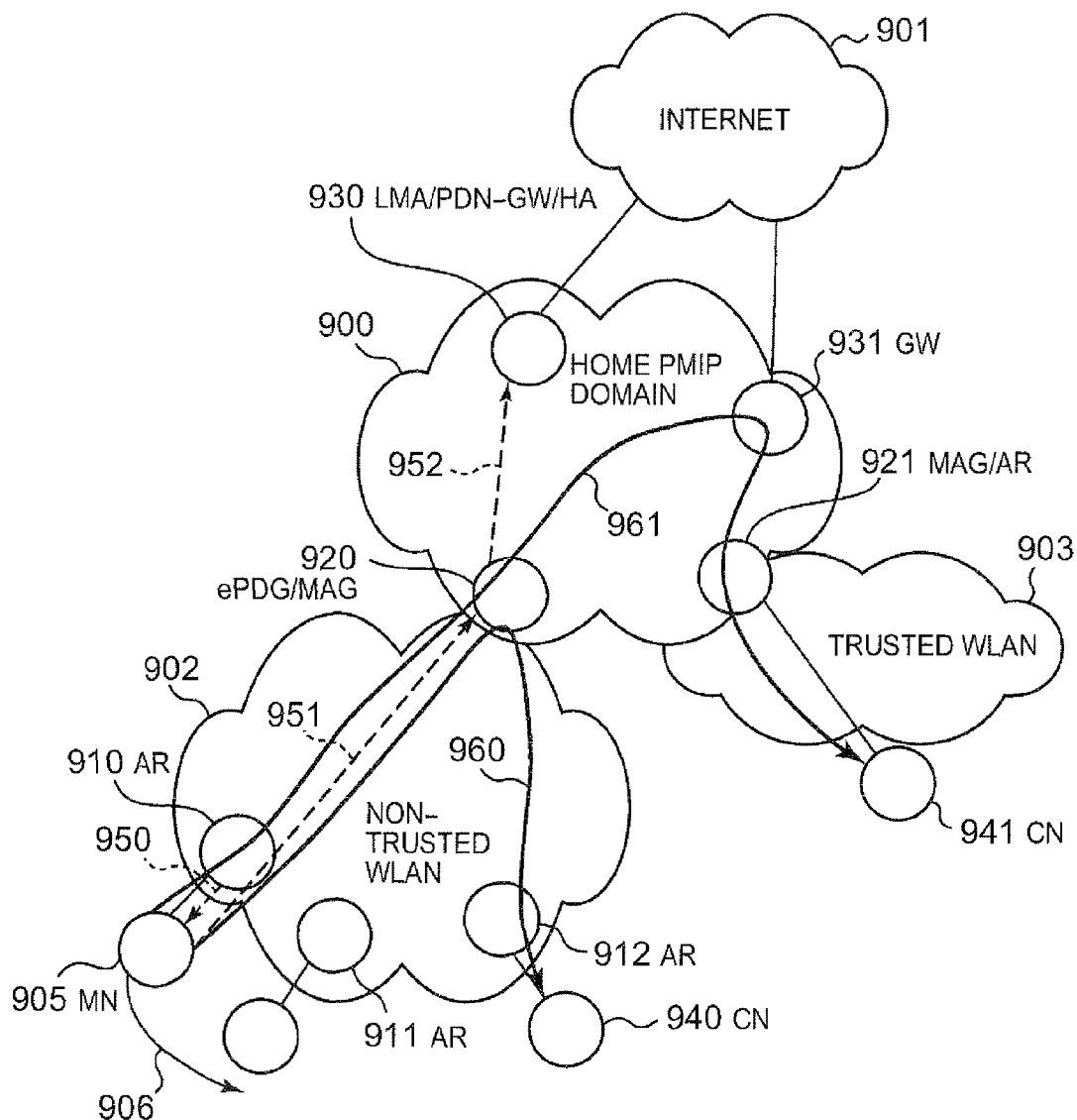
FIG. 9B illustrates still another exemplary network configuration to describe an embodiment of the present invention.
FIG. 10 illustrates exemplary binding cache to describe an embodiment of the present invention.

FIG. 9B illustrates binding cache 830 of the LMA/HA 820. In FIG. 9B, a first entry of the binding cache 830 represents registration created based on PBU transmitted related to a connection of the MAG 811 with IF2. A second entry of the binding cache 830 represents registration created at the LMA/HA 820 when the new message 827 is received from the MAG 811. This message 827 is BU concerning CMIP of IF1, to which a time stamp value is added as stated above. The cache created at the LMA/HA 820 related to the message 827 has a sequence number of BU of CMIP in accordance with the present time of BU related to CMIP.

Herein, when a message (PBU 825) transmitted from the MAG 810 reaches the LMA/HA 820 after the message 827, the time stamp value existing in the message 825 shows a time before the newest time indicated by the message 827, thus leading to abandonment of the message 825. As a result, packet loss of IF1 due to an error in registration order can be avoided.

An advantage of transmitting BU of CMIP via IF2 resides in that time (time stamp value) can be added to the BU Of CMIP. On the other hand, when BU concerning CMIP is transmitted from IF1 and time information on BU of CMIP is transmitted with the message 827 from IF2, there is a possibility that this message 827 reaches later than the BU concerning CMIP and the PBU 825, and there is a possibility that BU of CMIP is erased promptly before the arrival of the message 827 by incorrect binding obtained from the PBU 825.

Figure 11C:
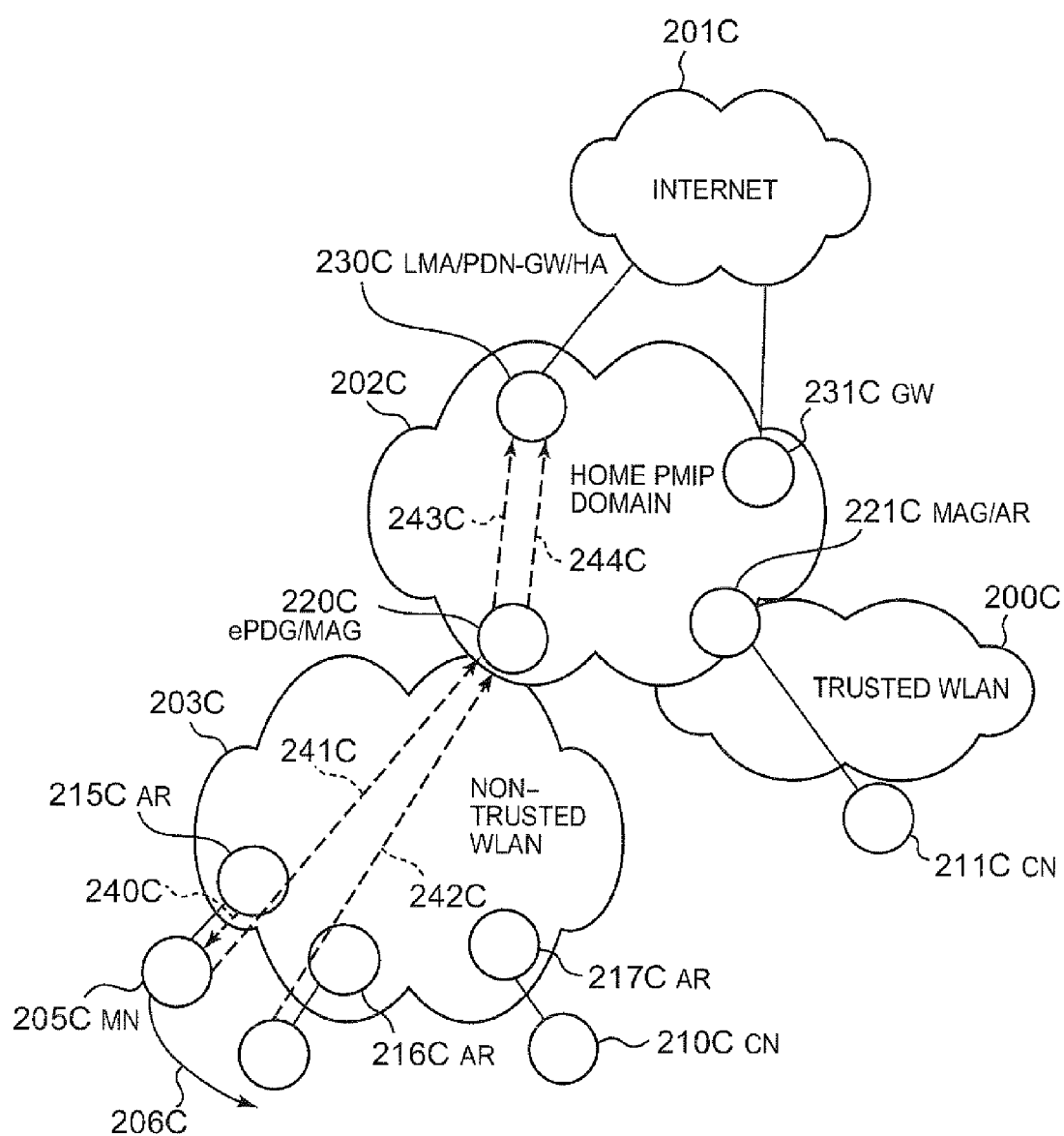
FIG. 11C illustrates a fourth exemplary network configuration to describe a problem in the conventional technique.

The following describes a method to cope with the problem of the conventional technique as illustrated in FIG. 11C. The conventional technique illustrated in FIG. 11C has a problem that it is not very effective to configure a care-of address using an on-link prefix for route optimization with any CN existing in a 3GPP domain (when a care-of address is configured with an on-link prefix, a route optimization session may have to be executed every time a connection of an AR is changed).

Referring now to FIG. 10, the following describes a method where a MN configures a care-of address to be used for a communication with any CN existing in a 3GPP domain using an ePDG in-prefix or an ePDG out-prefix, and further requests an ePDG/MAG to execute bulk registration of PMIP and CMIP having a "H" flag and any interface identification parameter.

In FIG. 10, a MN 905 moves to a non-trusted WLAN access network 902 and tries to conduct a route optimization communication with a CN 940 and a CN 941. Since the configuration of FIG. 10 is substantially the same as the configuration of FIG. 11C, the description for elements will be omitted in the following.

The MN 905 receives a different prefix with a message 950 from an AR 910. The MN 905 may request a prefix to select an appropriate prefix for a communication with each of the CNs disposed at different locations. This prefix may be an on-link prefix provided from the AR 910, a local prefix of PMIP indicating under the control of a LMA/PDN-GW/HA 930, an ePDG in-prefix or an ePDG out-prefix. The ePDG out-prefix represents a prefix associated with an ePDG (ePDG/MAG) 920 or a prefix under the control of the ePDG 920, for example. The ePDG in-prefix represents a prefix under the control of the GW 931, for example. The ePDG in-prefix or the ePDG out-prefix may be a prefix provided for each MN or a prefix provided common to a plurality of MNs.

It is obvious for those skilled in the art that, when the MN 905 conducts a communication with the CN 940, it is appropriate to implement route optimization using an ePDG out-prefix to reduce location registration signaling. In a route optimization path between the MN 905 and the CN 940, the ePDG 920 exists in a route optimization path and is located farthest away in a routing hierarchy, so that route can be optimized and location registration signaling can be reduced. When the MN 905 conducts a communication with the CN 941, it is appropriate to implement an optimized route and a decrease in location registration signaling using an ePDG in-prefix under the control of the GW 931. Similarly in a route optimization path between the MN 905 and the CN 941, route can be optimized and location registration signaling can be reduced by loopback of the GW 931.

After the ePDG 920 understands the present locations of the MN 905 and the CN 940, the ePDG 920 may advise the MN 905 and the CN 940 to use an ePDG out-prefix. Since tunnels from the MN 905 and the CN 940 to the ePDG 920 exist, the ePDG 920 can understand the present locations of the MN 905 and the CN 940 and can give advice to these end nodes (MN 905 and CN 940).

Meanwhile, when an ePDG out-prefix is used, there may be a need for the ePDG 920 to conduct duplicate address detection about an address configured using the prefix. This may occur when a shared prefix type model is carried out to assign a prefix for the ePDG 920, for example. When the MN 905 uses an ePDG out-prefix to configure a care-of address for route optimization with the CN 940, the MN 905 configures a care-of address and requests the ePDG 920 to transmit BU of CMIP and a PBU message of PMIP to the LMA 930. The MN 905 basically creates BU contents concerning CMIP and passes the same to the ePDG 920 via a tunnel as indicated with a message 951.

In addition to BU concerning CMIP, the ePDG (ePDG/MAG) 920 has to execute PBU of PMIP concerning a home prefix of PMIP at the LMA 930. Thus, the ePDG 920 can couple such PBU message of PMIP and BU message of CMIP and transmit the same. A message to transmit both of the BU message of CMIP and the PBU message of PMIP is transmitted from the ePDG 920 to the LMA 930 as indicated by a message 952. The binding including the coupling of PMIP and CMIP can be identified by means of a BID, an interface ID and a "H" flag.

When the MN 905 moves in a local access domain (non-trusted WLAN access network) 902, and in the case where route optimized communication can be achieved via a path 960 in spite of a change of an AR, there is no need to conduct location update signaling frequently. This is because even when the MN 905 moves as in the trace 906, it still connects with the same access router (ePDG/MAG) 920.

When the MN 905 and the CN 940 finish RR signaling and binding registration of a care-of address configured with an ePDG out-prefix, data packet transmission is started. At this time, when the data packet is transmitted through the path 960, a source address of the packet is an address obtained from the ePDG out-prefix. This packet is tunneled to the ePDG 920, and the ePDG 920 decapsulates this packet. A destination address of the packet subjected to the decapsulation is a care-of address of the CN 940 obtained from a prefix of the ePDG 920. The ePDG 920 conducts re-encapsulation of the packet in the tunnel to the CN 940. Herein, although FIG. 10 does not explicitly illustrate the details of the tunneling processing, those skilled in the art can understand the processing easily.

In the case where the MN 905 communicates with the CN 941 and a default path is via the GW 931, it is effective to conduct route optimization using an ePDG in-prefix. For instance, the GW 931 may carry out certain policy so that a default shortest route can be achieved in a network between the MN 905 and the CN 941 via the GW 931. Further in the case where a care-of address is configured using a prefix originating from the GW 931 (i.e., ePDG in-prefix), signaling load of the MN 905 moving in the home domain can be optimized, and further route optimization can be achieved. A data packet transmitted from the MN 905 to the CN 941 has a source address originating from the prefix of the GW 931. This packet is tunneled to the ePDG 920, and the ePDG 920 decapsualtes this data packet and tunnels the same to the GW 931. The GW 931 further decapsulates this packet, and further encapsulates the same in a tunnel to the MAG 921. When the data packet reaches the MAG 921 the MAG 921 passes the data packet directly to the CN 941 via a point-to-point line link. FIG. 10 illustrates a route optimization path 961 of a packet transmitted from the MN 905 configuring a care-of address using an ePDG in-prefix to the CN 941.

Herein, in the case where a prefix provided from a router higher in rank in a routing hierarchy is used and the router is a default router of a communication path between any MN and CN, a care-of address is preferably configured using a prefix originating from the router. Thereby, route optimization can be achieved, while avoiding frequent location update signaling.

When a communication is conducted with the CN 940, a route optimized path is via the ePDG 920 (router disposed in the highest rank in a routing hierarchy in a route optimized path between the MN 905 and the CN 940). Thus, it is desirable to realize route optimization using the prefix while reducing the amount of location update signaling. When a communication is conducted with the CN 941, a route optimized path is via the GW 931 (router disposed in the highest rank in a routing hierarchy in a route optimized path between the MN 905 and the CN 941). Thus, it is desirable to realize route optimization using a prefix originating from the GW 931 while reducing the amount of location update signaling. They are based on basic ideas to select a prefix. However, there may be a need for a network to inform what prefix is to be selected to enable selection of a prefix based on such a basic idea. For instance, a certain network entity may monitor a packet of a MN or a CN, and give advice (notification of an appropriate prefix) to the MN or the CN based on a result of the monitoring.

The present specification provides drawings and description so that the present invention can be the most practical and preferable embodiment. However, it would be obvious for those skilled in the art that the present invention can be modified variously for the design of elements of the above-stated devices and details of the parameters without departing from the scope of the present invention.

For instance, the present invention is applicable to the case where a mobile node has two interfaces, one of which connects with a home PMIPv6 domain and the other connects with a foreign PMIPv6 domain. Further, even in the case where a CN exists in a home PMIPv6 domain of a MN and conducts a communication with a home address of an interface of the MN connecting with a foreign PMIPv6 domain, route optimization can be achieved with the technique according to the present invention.

Further, before movement, a UE connects with a home PMIPv6 domain in the above-stated embodiments. However, the UE may connect with a foreign PMIPv6 domain that a home operator does not manage or another 3GPP domain, or may connect with an access network connecting without using MIPv6. Further, this may be a different access network such as WiMAX or WLAN, an integrated network of wireless-system and fixed-system using FMC (Fixed Mobile Convergence), for example, or a network related to network configuration such as NGN (Next Generation Network) managed in an advanced manner, and a relationship with such networks may be high or low. Similarly, after movement, the UE connects with a foreign network in the above-stated embodiments. However, this foreign network may be a domain (as long as a domain where the UE uses MIPv6, the domain is not limited by access techniques) that the UE activates such as a foreign PMIPv6 domain or a non 3GPP access network. The present invention is further applicable to the case where the UE does not move while connecting with a home PMIPv6 domain and activates MIPv6 for local breakout.

The present specification describes based on the precondition that there are a plurality of network interfaces of a MN. However, a MN may have a plurality of logical interfaces to embody the present invention. For instance, one wireless part may be shared among a plurality of connection methods, which may be switched at a rate whose change can be ignored from aspects of a network interface, or a logical link may be maintained at layer 2, whereby it can be configured so as to operate in a similar manner to the case where a network part connects with a network via a plurality of interfaces.

The present invention exemplifies a network configuration as a simple configuration illustrated in the drawings. However, the configuration of a local network domain conceivably has varieties including a roaming relationship between a plurality of operators. For instance, as a possible configuration, a MAG may be an access router direct to a mobile node or a boundary router with a different access network (including roaming), and a mobile node once connects with the different access network and thereafter connects with the MAG as the boundary router via the access network. In any case, although design parts such as various parameters, a procedure to reach a MAG from a terminal, a communication procedure of a terminal are different, an operation of the present invention is obviously applicable thereto in a similar manner.

The above-described embodiments are based on the precondition of a local mobility management environment. However, the present invention is applicable also to a mobile network (or a layered-mobile network) configured with a mobile router (MR) (and nodes thereunder).

For instance, NEMO (NEtwork MObility) as one method of configuring a mobile network provides mobility support to a mobile terminal, where a MR conducts movement registration of a mobile network (and a terminal) with a HA (home agent), and the present invention is applicable thereto where a MAG in the present specification corresponds to the MR. In this case, a LMA can be considered corresponding to the HA of the MR. Further, in the case where a network operator providing a network using PMIP uses a tunnel between MAG-LMA configuring PMIP as a multistage, the present invention corresponds to a layered-mobile network.

The present invention is further applicable to an overlay network environment. For instance, the present invention is applicable so that mobility support by a MAG to a mobile terminal corresponds to pHA (Proxy HA). In this case, a home agent serving as an origin (this may have various cases, including with reference to a certain time (relative) or a state of registration to a network operator (definite)) of the movement of a mobile node or another home agent receiving registration information from a home agent connecting with a mobile node conceivably corresponds to a LMA.

Note that each functional block used in the descriptions of the above-stated embodiments may be typically implemented as a LSI (Large Scale Integration) that is an integrated circuit. These blocks may be individually configured as one chip, or one chip may include a part or all of the functional blocks.

LSIs may be called an IC (Integrated Circuit), a system LSI, a super LSI, and an ultra LSI depending on the degree of integration.

A technique for integrated circuit is not limited to LSI, and an integrated circuit may be implemented using a dedicated circuit or a general-purpose processor. After manufacturing a LSI, a FPGA (Field Programmable Gate Array) capable of programming and a reconfigurable processor capable of reconfiguring connection and setting of a circuit cell inside a LSI may be used.

Further, if a technique for integrated circuit that replaces LSIs becomes available by the development of a semiconductor technique or derived techniques, functional blocks may be naturally integrated using such a technique. For instance, biotechnology may be applied thereto.

INDUSTRIAL APPLICABILITY

A network node and a mobile terminal of the present invention have an effect of, when the mobile terminal moves in a PMIP domain, allowing the mobile terminal to receive various selectable prefixes from an access router and an effect of allowing the mobile terminal to select an address type to be configured from an available prefix and conduct a communication with a correspond node while optimizing a route without signaling load on the PMIP domain. The network node and the mobile terminal of the present invention are applicable to a communication technique field in a system of a packet-exchange type data communication network (especially, a network system implementing network-based local mobility management protocol such as PMIP).

The invention claimed is:

1. A communication control method in a communication system that configures a network domain implementing a network-based local mobility management protocol, the communication system including a location management node having a function of managing location information of a mobile terminal connecting with the network domain, a proxy registration node having a function of registering location information of the mobile terminal as a proxy, and an authorization server that authorizes the mobile terminal, the method comprising the steps of:
   a prefix acquisition step where the mobile terminal with the network domain as a home domain acquires a plurality of prefixes;
   an address acquisition step where the mobile terminal acquires a plurality of addresses from the plurality of prefixes;
   an address notification step where the mobile terminal notifies the proxy registration node in the network domain of the plurality of addresses; and
   a binding registration step where the proxy registration node registers, with the location management node, binding information on each of the plurality of addresses received from the mobile terminal, and
   wherein the proxy registration node uses, as the binding information of the mobile terminal registered with the location management node, first binding information and second binding information,
   the first binding information associating a home address of the mobile terminal or a domain prefix assigned to the mobile terminal from the authorization server with an address or a prefix of the proxy registration node, and
   the second binding information associating the home address of the mobile terminal with an on-link address configured with an on-link prefix of a connection point of the mobile terminal.

2. A network node functioning as a proxy registration node in a communication system that configures a network domain implementing network-based local mobility management protocol, the communication system including: a location management node having a function of managing location information of a mobile terminal connecting with the network domain; a proxy registration node having a function of registering location information of the mobile terminal as a proxy; and an authorization server that authorizes the mobile terminal, comprising:
   means that receives from the mobile terminal a plurality of addresses configured by the mobile terminal with the network domain as a home domain based on a plurality of prefixes;
   means that registers, with the location management node, binding information relating to each of the plurality of addresses received from the mobile terminal; and
   means that uses, as the binding information of the mobile terminal registered with the location management node, first binding information and second binding information,
   the first binding information associating a home address of the mobile terminal or a domain prefix assigned to the mobile terminal from the authorization server with an address or a prefix of the proxy registration node, and
   the second binding information associating the home address of the mobile terminal with an on-link address configured with an on-link prefix of a connection point of the mobile terminal.

3. The network node according to claim 2, comprising:
   means that receives a request from the mobile terminal of the plurality of prefixes; and
   means that processes so that the plurality of prefixes are notified to the mobile terminal based on the request from the mobile terminal of the plurality of prefixes.

4. The network node according to claim 3, comprising means that selects the plurality of prefixes notified to the mobile terminal from the domain prefix, the on-link prefix and the address or the prefix of the proxy registration node.

5. The network node according to claim 2, comprising means that, when the binding information relating to each of the plurality of addresses received from the mobile terminal is registered with the location management node, generates one registration message including the binding information relating to each of the plurality of addresses received from the mobile terminal and transmits the registration message to the location management node.

6. The network node according to claim 2, comprising means that sets priority for use in the location management node with respect to the binding information relating to each of the plurality of addresses.

7. A network node functioning as a proxy registration node in a communication system that configures a network domain implementing network-based local mobility management protocol, the communication system including: a location management node having a function of managing location information of a mobile terminal connecting with the network domain; a proxy registration node having a function of registering location information of the mobile terminal as a proxy; and an authorization server that authorizes the mobile terminal, comprising:
   means that receives from the mobile terminal a plurality of addresses configured by the mobile terminal with the network domain as a home domain based on a plurality of prefixes;

means that registers, with the location management node, binding information relating to each of the plurality of addresses received from the mobile terminal; and means that, when the mobile terminal has a plurality of interfaces and at least one of the plurality of interfaces connects with a foreign network domain, receives from the mobile terminal a notification of an address set corresponding to a communication interface connecting with the foreign network domain.

8. A mobile terminal connectable with a communication system that configures a network domain implementing network-based local mobility management protocol, the communication system including: a location management node having a function of managing location information of the mobile terminal connecting with the network domain; a proxy registration node having a function of registering location information of the mobile terminal as a proxy; and an authorization server that authorizes the mobile terminal, the mobile terminal with the network domain as a home domain comprising:

means that acquires a plurality of prefixes;

means that acquires a plurality of addresses from the plurality of prefixes; and means that notifies the proxy registration node in the network domain of the plurality of addresses so that the proxy registration node registers, with the location management node, binding information on each of the plurality of addresses received from the mobile terminal, and the proxy registration node uses, as the binding information of the mobile terminal registered with the location management node, first binding information and second binding information, the first binding information associating a home address of the mobile terminal or a domain prefix assigned to the mobile terminal from the authorization server with an address or a prefix of the proxy registration node, and the second binding information associating the home address of the mobile terminal with an on-link address configured with an on-link prefix of a connection point of the mobile terminal.

9. The mobile terminal according to claim 8, wherein the means that acquires a plurality of prefixes comprises:

means that makes a request of the plurality of prefixes when connecting with the network domain; and means that receives the plurality of prefixes notified in response to the request of the plurality of prefixes.

10. The mobile terminal according to claim 9, comprising means that configures, from the domain prefix and a global prefix received in response to the request of the plurality of prefixes, the home address including the domain prefix and a global address including the global prefix.

11. The mobile terminal according to claim 10, comprising means that generates a message to make a notification of both of the home address and the global address and transmits the message to an access router connecting with the mobile terminal.

12. The mobile terminal according to claim 8, comprising means that, in a state where the mobile terminal connects with the home domain, decides to use the home address configured with the domain prefix among the plurality of prefixes for communications with a legacy correspondent node and a correspondent node existing in another network domain.

13. The mobile terminal according to claim 8, comprising means that, in a state where the mobile terminal connects with the home domain, decides to use the on-link address configured with the on-link prefix among the plurality of prefixes for a communication with a correspondent node connecting with the same home domain.

14. The mobile terminal according to claim 8, comprising means that, in a state where the mobile terminal connects with the home domain, decides to use the address or the prefix of the registration proxy node among the plurality of prefixes for a communication with a correspondent node connecting with the same home domain.

15. The mobile terminal according to claim 8, comprising means that, in a state where the mobile terminal connects with a foreign domain different from the home domain, decides to use a foreign domain prefix address configured with a foreign domain prefix notified from the foreign domain for a communication with a correspondent node existing in a domain different from the foreign domain.

16. The mobile terminal according to claim 8, comprising means that, in a state where the mobile terminal connects with a foreign domain different from the home domain, decides to use a foreign domain prefix address configured with a foreign domain prefix notified from the foreign domain for route optimization processing in a communication with a correspondent node existing in the foreign domain.

17. The mobile terminal according to claim 8, comprising a plurality of communication interfaces, wherein when at least one of the plurality of communication interfaces connects with a foreign network domain, the means that notifies the proxy registration node in the network domain of the plurality of addresses notifies the proxy registration node in the network domain of an address set corresponding to the communication interface connecting with the foreign network domain from a communication interface connecting with the home domain.

* * * * *